(12) United States Patent
Yershov et al.

(10) Patent No.: US 11,449,705 B2
(45) Date of Patent: Sep. 20, 2022

(54) FIELD THEORY BASED PERCEPTION FOR AUTONOMOUS VEHICLES

(71) Applicant: Motional AD LLC, Boston, MA (US)

(72) Inventors: Dmytro S. Yershov, Cambridge, MA (US); Hsun-Hsien Chang, Brookline, MA (US)

(73) Assignee: Motional AD LLC, Boston, MA (US)

( * ) Notice: Subject to any disclaimer, the term of this patent is extended or adjusted under 35 U.S.C. 154(b) by 114 days.

(21) Appl. No.: 16/736,942

(22) Filed: Jan. 8, 2020

(65) Prior Publication Data

US 2020/0257931 A1    Aug. 13, 2020

Related U.S. Application Data

(60) Provisional application No. 62/789,808, filed on Jan. 8, 2019, provisional application No. 62/837,902, filed on Apr. 24, 2019.

(30) Foreign Application Priority Data

May 10, 2019    (DK) .......................... PA-2019-70302

(51) Int. Cl.
*G06K 9/62*    (2022.01)
*B60W 60/00*    (2020.01)

(52) U.S. Cl.
CPC ....... *G06K 9/6226* (2013.01); *B60W 60/0011* (2020.02); *B60W 60/0015* (2020.02)

(58) Field of Classification Search
None
See application file for complete search history.

(56) References Cited

U.S. PATENT DOCUMENTS

| 10,303,178 B1 | 5/2019 | Gutmann et al. |
| 2002/0152156 A1 | 10/2002 | Tyson-Quah et al. |

(Continued)

FOREIGN PATENT DOCUMENTS

| CN | 107180146 | 9/2017 |
| CN | 109844562 | 6/2019 |

(Continued)

OTHER PUBLICATIONS

Solanki, "Development of Sensor Component for Terrain Evaluation and Obstacle Detection for an Unmanned Autonomous Vehicle", May 2007, University of Florida, AFRL-RX-TY-TM-2009-4554, p. 45-49 (Year: 2007).*

(Continued)

*Primary Examiner* — Tamara L Weber
(74) *Attorney, Agent, or Firm* — Fish & Richardson P.C.

(57) ABSTRACT

Technology described in this document can be embodied in a method that includes generating, using one or more processing devices of a vehicle operating in an environment, a discretized representation of the environment, including a plurality of cells. The cells are occupied by particles representing at least one of: an object, or a free space in the environment. Sensor data indicative of a state of at least one particle is received, and an update to a time-varying particle density function associated with a location of the particle in the dynamic occupancy grid is calculated from the sensor data and one or more models. The method further includes generating a prediction of occupancy of at least one cell in the discretized representation based on the updated particle density function, and operating the vehicle, using a controller circuit of the vehicle, based at least in part on the prediction.

36 Claims, 18 Drawing Sheets

(56) References Cited

U.S. PATENT DOCUMENTS

| | | | |
|---|---|---|---|
| 2004/0133509 | A1 | 7/2004 | McCoy et al. |
| 2005/0234679 | A1* | 10/2005 | Karlsson ............... G05D 1/0248 702/181 |
| 2008/0027591 | A1* | 1/2008 | Lenser ................ G05D 1/0251 701/2 |
| 2012/0053755 | A1 | 3/2012 | Takagi |
| 2017/0124476 | A1 | 5/2017 | Levinson et al. |
| 2017/0161946 | A1 | 6/2017 | Aghamohammadi et al. |
| 2017/0256071 | A1 | 9/2017 | Laugier et al. |
| 2018/0113209 | A1* | 4/2018 | Campbell ............... G01S 17/42 |
| 2018/0247216 | A1 | 8/2018 | Mottin et al. |
| 2018/0307245 | A1* | 10/2018 | Khawaja ............... G05D 1/0212 |
| 2018/0373264 | A1 | 12/2018 | Madsen et al. |
| 2019/0049239 | A1* | 2/2019 | Natroshvili ........ G06K 9/00838 |
| 2020/0086855 | A1 | 3/2020 | Packet et al. |
| 2020/0271787 | A1* | 8/2020 | You ......................... G01S 17/89 |
| 2021/0073321 | A1* | 3/2021 | Steyer ................ G06K 9/00805 |
| 2021/0131823 | A1 | 5/2021 | Giorgio et al. |
| 2021/0354690 | A1 | 11/2021 | Yershov et al. |

FOREIGN PATENT DOCUMENTS

| | | |
|---|---|---|
| EP | 3514648 | 7/2019 |
| JP | 2013-234919 | 11/2013 |
| JP | 2015-197417 | 11/2015 |
| KR | 10-2018-0068711 | 6/2018 |
| WO | WO 2019141311 | 7/2019 |
| WO | WO 2019/244060 | 12/2019 |
| WO | WO 2020/053611 | 3/2020 |

OTHER PUBLICATIONS

Erkentetal, "Semantic Grid Estimation with Occupancy Grids and Semantic Segmentation Networks", Nov. 18-21, 2018, 2018 15th International Conference on Control, Automation, Robotics and Vision (ICARCV), p. 1051-1056 (Year: 2018).*

Danescu et al., "Modeling and tracking the driving environment with a particle-based occupancy grid." IEEE Transactions on Intelligent Transportation Systems. Jul. 7, 2011, 12(4):1331-42.

Tanzmeister et al., "Evidential grid-based tracking and mapping," IEEE Transactions on Intelligent Transportation Systems, Oct. 20, 2016, 18(6):1454-67.

DK Intention to Grant in Danish Appln. No. PA201970302, dated Apr. 27, 2021, 2 pages.

DK Office Action in Danish Appln. No. PA201970302, dated Feb. 23, 2021, 3 pages.

DK Search Report in Danish Appln. No. PA201970302, dated Sep. 23, 2020, 3 pages.

[No Author Listed], "J3016: Taxonomy and Definitions for Terms Related to On-Road Motor Vehicle Automated Driving Systems" SAE International, Sep. 2016, 30 pages.

Danescu et al., "Modeling and Tracking the Driving Environment With a Particle-Based Occupancy Grid," IEE Transactions on Intelligent Transportation Systems, Dec. 2011, 12(4):1331-1342.

DK Search Report in Danish Appln. No. PA201970302, dated Oct. 4, 2019, 10 pages.

Nuss et al., "A Random Finite Set Approach for Dynamic Occupancy Grid Maps with Real-Time Application," International Journal of Robotics Research, 2018, 37(8):841-866.

PCT International Search Report and Written Opinion in International Appln. No. PCT/US2020/012659, dated Apr. 29, 2020, 18 pages.

Tanzmeister et al., "Evidential Grid-Based Tracking and Mapping," IEEE Transactions on Intelligent Transportation Systems, Jun. 2017, 18; 1454-1467.

PCT International Preliminary Report on Patentability in International Appln. No. PCT/US2020/012659, dated Jul. 22, 2021, 11 pages.

* cited by examiner

FIELD THEORY BASED PERCEPTION FOR AUTONOMOUS VEHICLES

CROSS-REFERENCE TO RELATED APPLICATIONS

This application claims the benefit of U.S. Provisional Application 62/789,808, filed on Jan. 8, 2019, U.S. Provisional Application 62/837,902, filed on Apr. 24, 2019, and Denmark Application PA-2019-70302, filed on May 10, 2019, all three of which are incorporated herein by reference in their entirety.

FIELD OF THE INVENTION

This description relates to autonomous vehicles such as self-driving cars, aircrafts, boats, and other vehicles.

BACKGROUND

Autonomous vehicles include specialized processing circuits (sometimes referred to as perception circuits) that integrate inputs from one or more sensors to determine locations of objects in the environment surrounding the autonomous vehicles. The information determined about the environment can be used to navigate the vehicle.

SUMMARY

In one aspect, this document features a method that includes generating, using one or more processing devices of a vehicle operating in an environment, a discretized representation of the environment, the discretized representation including a plurality of cells. Each cell of the plurality of cells is occupied by particles representing at least one of: an object, or a free space in the environment. The method also includes receiving, from one or more sensors of the vehicle, sensor data indicative of a state of at least one particle of the multiple particles in the environment, and determining, using the one or more processing devices, an update to a time-varying particle density function associated with a location of the at least one particle in the dynamic occupancy grid from the sensor data and one or more models associated with the one or more sensors. The method further includes generating, using the one or more processing devices a prediction of occupancy of at least one cell in the discretized representation based on the updated particle density function, and operating the vehicle, using a controller circuit of the vehicle, based at least in part on the prediction.

In another aspect, this document features one or more non-transitory storage media storing instructions which, when executed by one or more computing devices, cause performance of the above method.

In another aspect, this document features a method that includes instantiating, using a processing circuit onboard one or more sensors, a set of interacting software components that represent contents of cells of a discretized representation of an environment. The method also includes receiving, from the one or more sensors, a vector of sensor observations associated with an interacting software component of the set of interacting software components. The vector of sensor observations includes one or more parameters associated with the interacting software component at a given location. The method further includes determining, using the processing circuit, an update to a time-varying particle density function associated with a cell of the cells of the discretized representation corresponding to the given location from the vector of sensor observations based on one or more associated with the sensors, generating, using the processing circuit, a prediction of occupancy of the cell based on the updated particle density function, and augmenting, using the processing circuit, an operation of a vehicle based on the prediction.

In another aspect, this document features a vehicle that includes one or more computer processors; and one or more non-transitory storage media for storing instructions. The instructions, when executed by one or more processors cause performance of various operations. The operations include generating a discretized representation of the environment, the discretized representation including a plurality of cells. Each cell of the plurality of cells is occupied by multiple particles representing at least one of: an object, or a free space in the environment. The operations also include receiving, from one or more sensors of the vehicle, sensor data indicative of a state of at least one particle of the multiple particles in the environment, and determining an update to a time-varying particle density function associated with a location of the at least one particle in the dynamic occupancy grid from the sensor data and one or more models associated with the one or more sensors. The operations further include generating a prediction of occupancy of at least one cell in the discretized representation based on the updated particle density function, and operating the vehicle based at least in part on the prediction.

In another aspect, this document features a method that includes instantiating, using a processing circuit onboard one or more sensors, a set of interacting software components that represent contents of cells of a discretized representation of an environment, and receiving, from the one or more sensors, a vector of sensor observations associated with an interacting software component of the set of interacting software components. The vector of sensor observations includes one or more parameters associated with the interacting software component at a given location. The method further includes determining, using the processing circuit and from the vector of sensor observations, an update to a time-varying particle density function associated with a cell of the cells of the discretized representation corresponding to the given location. The method also includes generating, using the processing circuit, a prediction of occupancy of the cell based on the updated particle density function, and augmenting, using the processing circuit, an operation of a vehicle based on the prediction.

In another aspect, this document features one or more non-transitory storage media storing instructions which, when executed by one or more computing devices, cause performance of the above method.

In another aspect, this document features a vehicle that includes one or more computer processors; and one or more non-transitory storage media for storing instructions. The instructions, when executed by one or more processors cause performance of various operations. The operations include instantiating a set of interacting software components that represent contents of cells of a discretized representation of an environment, and receiving, from the one or more sensors, a vector of sensor observations associated with an interacting software component of the set of interacting software components. The vector of sensor observations includes one or more parameters associated with the interacting software component at a given location. The operations also include determining an update to a time-varying particle density function associated with a cell of the cells of the discretized representation corresponding to the given location from the vector of sensor observations. The operations further include generating a prediction of occupancy of the cell based on the updated particle density function, and augmenting an operation of the vehicle based on the prediction.

Implementations of the above aspects can include one or more of the following features.

The discretized representation can include a grid defined using a Cartesian or polar coordinate system. For each cell of the plurality of cells, an initial value of occupancy can be first assigned, and then updated in accordance with an evolution of the particle density function. Labels can also be assigned to the multiple particles, each label indicating whether the corresponding particle represents an object or a free space. The labels can be updated in accordance with the sensor data. Determining the update to the time-varying particle density function can include determining, using an Eulerian solver or a Lagrangian solver, solutions to one or more differential equations defined on one or more parameters associated with the state of the at least one particle. The state of the at least one particle can include at least one velocity associated with the at least one particle. The state of the at least one particle can include (i) multiple velocities along corresponding directions, and (ii) covariances associated with the multiple velocities. The state of the at least one particle can include a force acting on the at least one particle. Each of the one or more models represents a sensor model trained to provide information on probabilities of occupancy of various cells of the discretized representation, the probabilities being conditioned on corresponding sensor data. Generating the prediction of occupancy of the at least one cell can include determining a probability of occupancy of the at least one cell as a product of (i) a ratio of conditional probabilities generated based on the sensor data and the one or more sensor models, and (ii) an updated time-varying particle density function for the at least one cell. The ratio of conditional probabilities can be a ratio of (i) a first probability of receiving the sensor data conditioned on the at least one cell being occupied and (ii) a second probability of receiving the sensor data conditioned on the at least one cell being unoccupied, wherein the first and second probabilities are determined using the one or more sensor models. If the sensor data corresponding to a particular sensor is determined to be outside a threshold range of expected values determined using a corresponding model associated with the particular sensor, a fault condition for the particular sensor can be identified in response. If a determination is made that the sensor data is missing at least one parameter indicative of the state of the at least one particle, a prior value of the at least one parameter can be used in determining the update to the time-varying particle density function. At least a portion of the one or more processing devices can be disposed in a perception circuit of the vehicle.

In some implementations, the technology described herein can provide one or more of the following advantages.

By representing objects and free space in the environment as a collection of particles (e.g., akin to application of field theory in fluid dynamics), and using an Eulerian approach to track time varying particle density functions, the technology described herein allows for an improved dynamic range, and potentially higher resolution at a more manageable computational complexity, as compared to, for example, tracking individual grid cells. For example, to obtain a 28 bit accuracy without the technology described herein, tracking of $2^{28}$ particles per grid may be needed, which entails an enormous computational burden. In contrast, tracking time varying particle density functions using the technology described herein in an equivalent discretized space at 28 bits accuracy can be done at significantly lower computational burden at least because there is no need to account for individual particles within a given grid-cell of the discretized space. In addition, the proposed approach is independent of any particular grid, and hence does not need to be substantially modified for different grids. Also, because particles can be defined and tracked for free spaces, the proposed technique allows for tracking of free-space, which in turn can potentially improve navigation capabilities of autonomous vehicles. By selecting appropriate parameters (velocities, forces, etc.) to model particle dynamics, occluded or partially visible objects may be tracked with accuracy by tracking the corresponding particle density functions.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
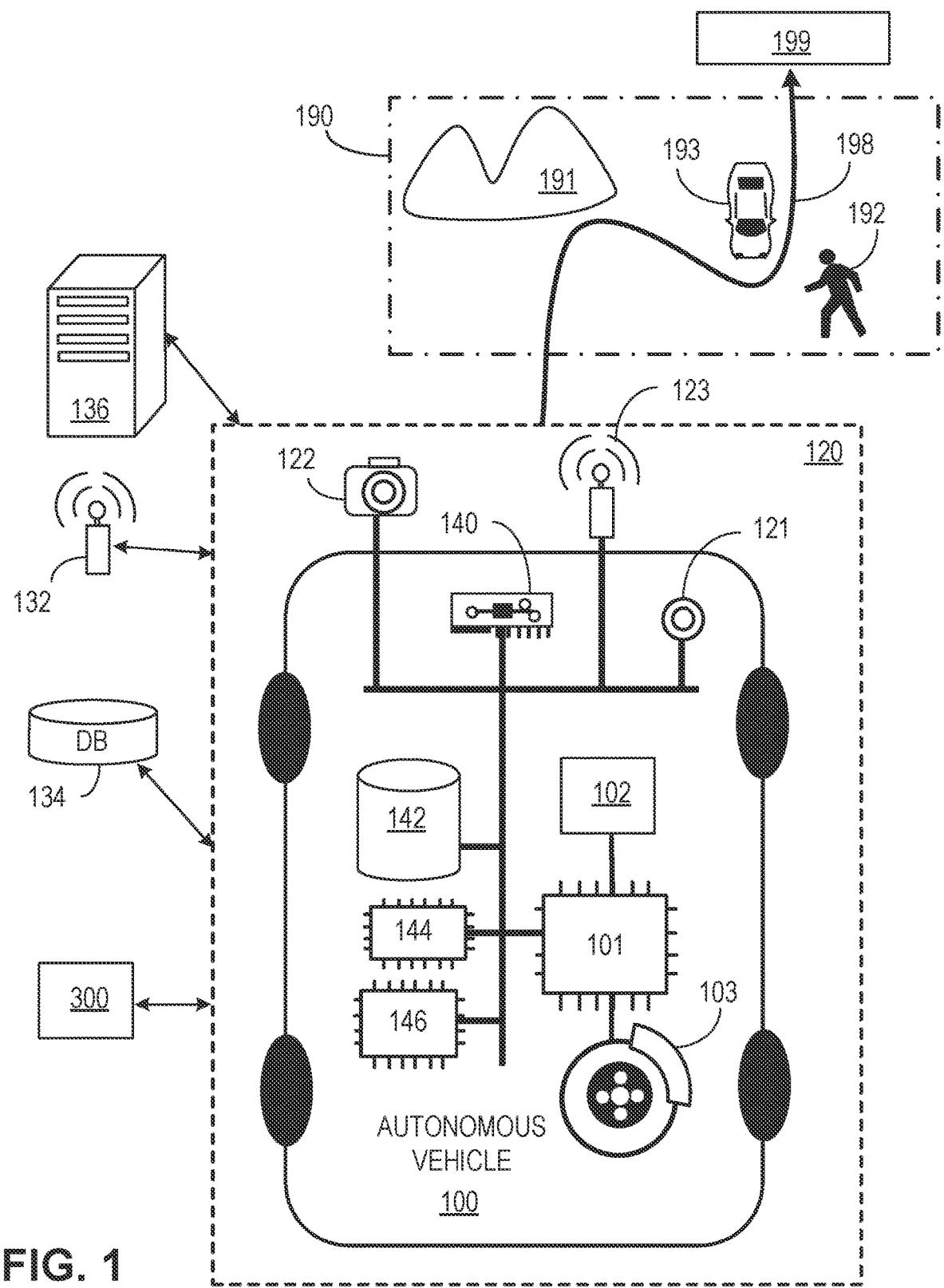
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Path Planning
6. Autonomous Vehicle Control
7. Field Theory Based Perception General Overview This document presents technology for improving perception of objects and free space in the environment of an autonomous vehicle. Specifically, the technology allows for modeling the objects and free space as a collection of particles, similar to how fluids are modeled in field theory-based fluid dynamics. Particles instantiated as representations of objects and free space can be tracked by updating time-varying particle density functions across a discretized representation of the environment, and such updated particle density functions can be used to compute (e.g., predict) probabilities of occupancy of various cells of the discretized representation.

In an embodiment, the updates to the particle density functions can be calculated by a perception module of an autonomous vehicle using real-time sensor observations, as well as pre-computed models corresponding to the sensors. In some implementations, the sensor model can be a forward sensor model. The pre-computed models take into account multiple parameters of the corresponding particle dynamics including, for example, velocity of particle along different directions, velocity covariances, and possibly any force being exerted on the particles. An Eulerian solver or a Lagrangian solver is used to compute solutions to differential equations on the multiple parameters using, which in turn enables the perception module to generate images with higher dynamic range and higher resolution as compared to other processes that track occupancy of grid cells. Further, because statistics of particle density functions (rather than individual particles) are tracked, the technology allows for generating such high dynamic range and high resolution perception images without increasing the computational burdens to unacceptable levels. The technology described herein also avoids performance-limiting assumptions such as rigid-body and constant velocity assumptions and allows for early fusion of information from various sensors (e.g., radar and LiDAR) to improve subsequent planning and control operations of autonomous vehicles.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability. As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
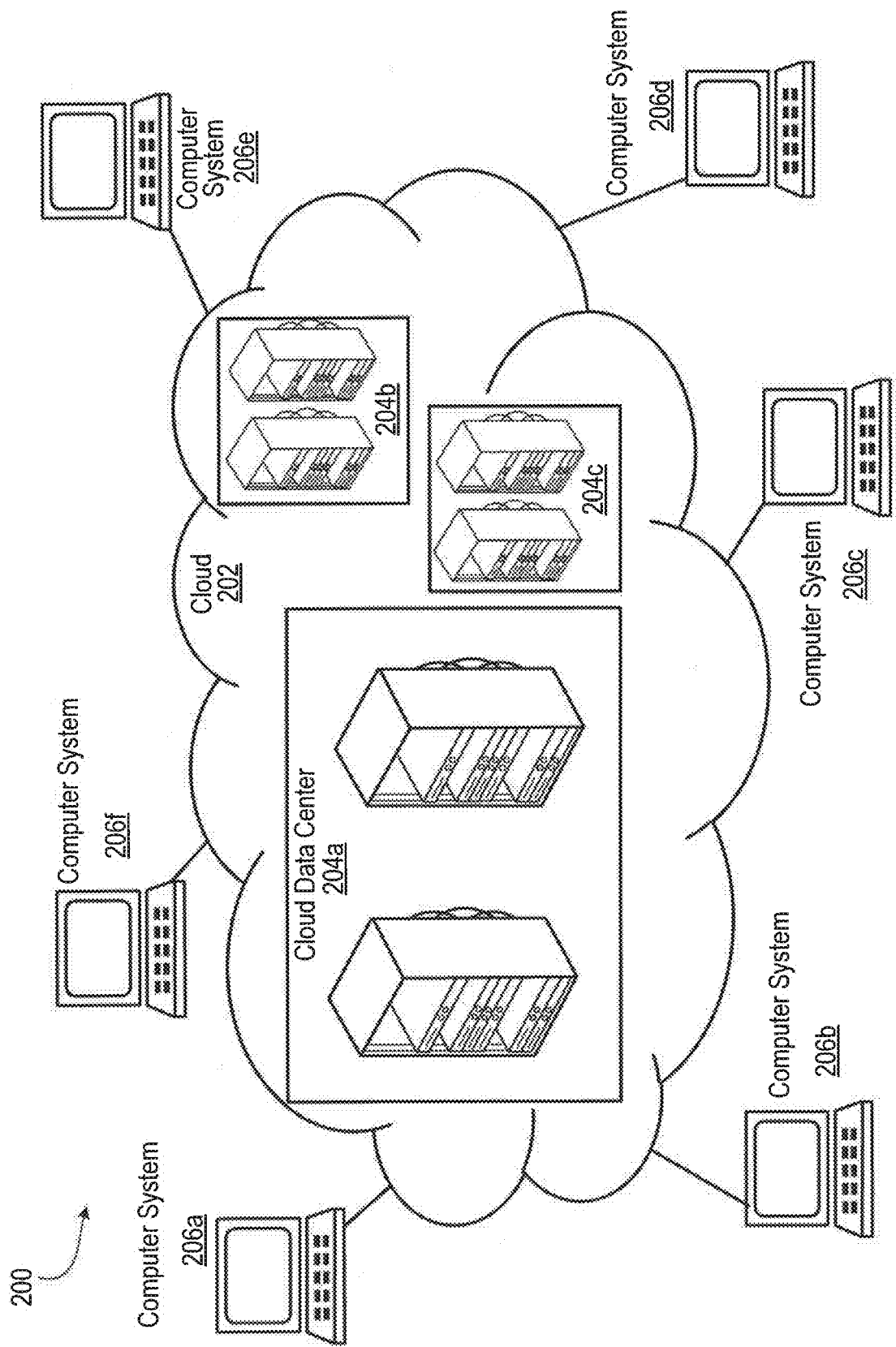
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
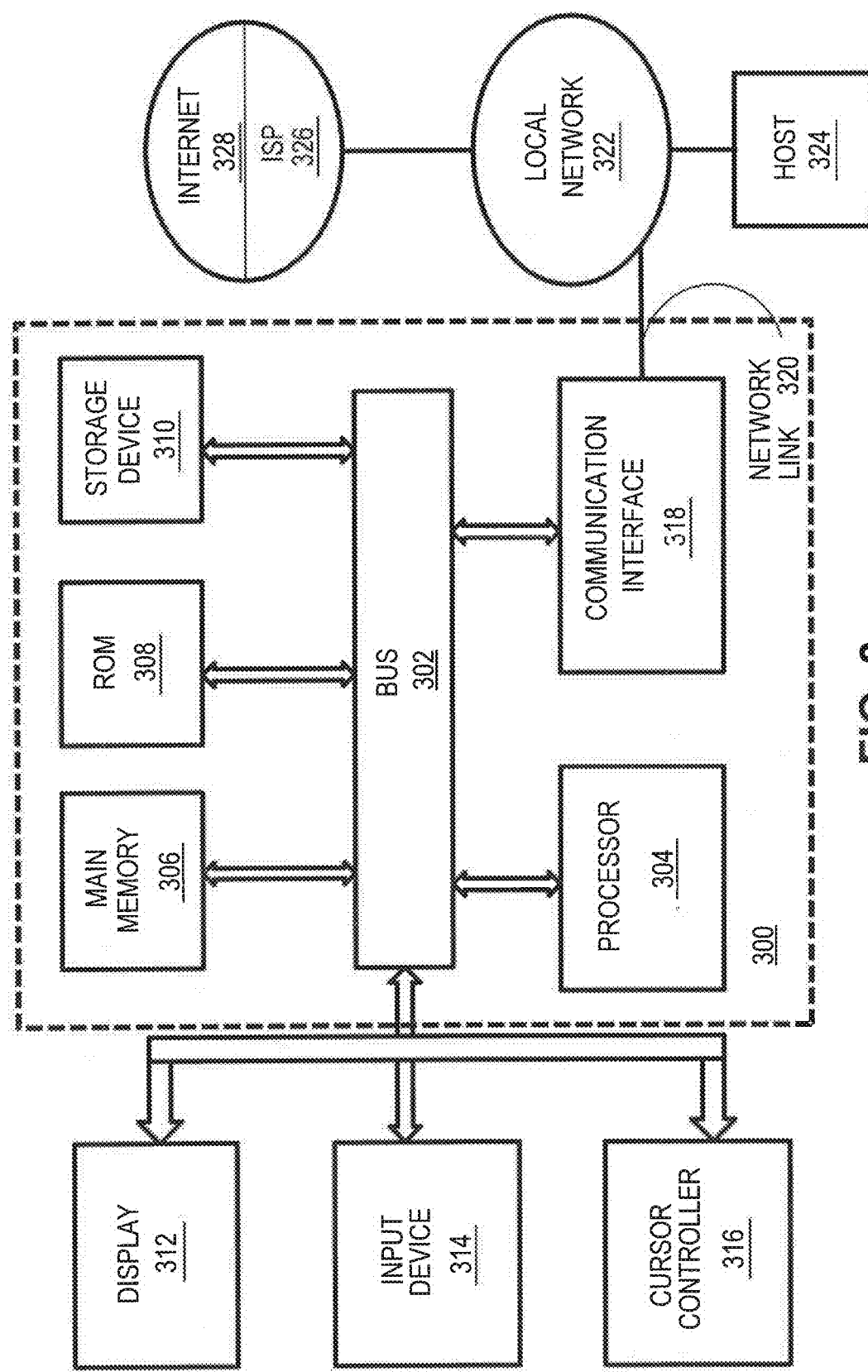
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), a plasma display, a light emitting diode (LED) display, an active-matrix organic light-emitting diode (AMOLED) display, a quantum dot light emitting diode (QLED) display, a vacuum fluorescent display, an e-ink display, a cold cathode (nixie tube) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
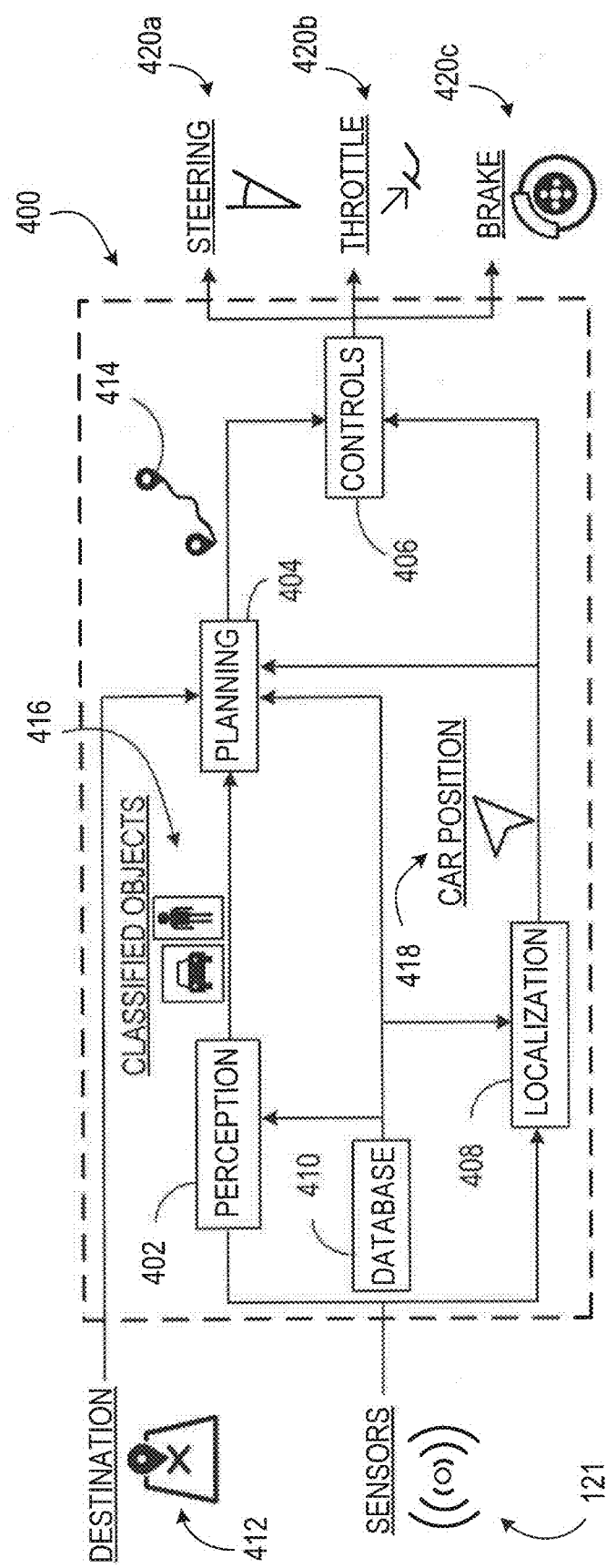
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, and ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
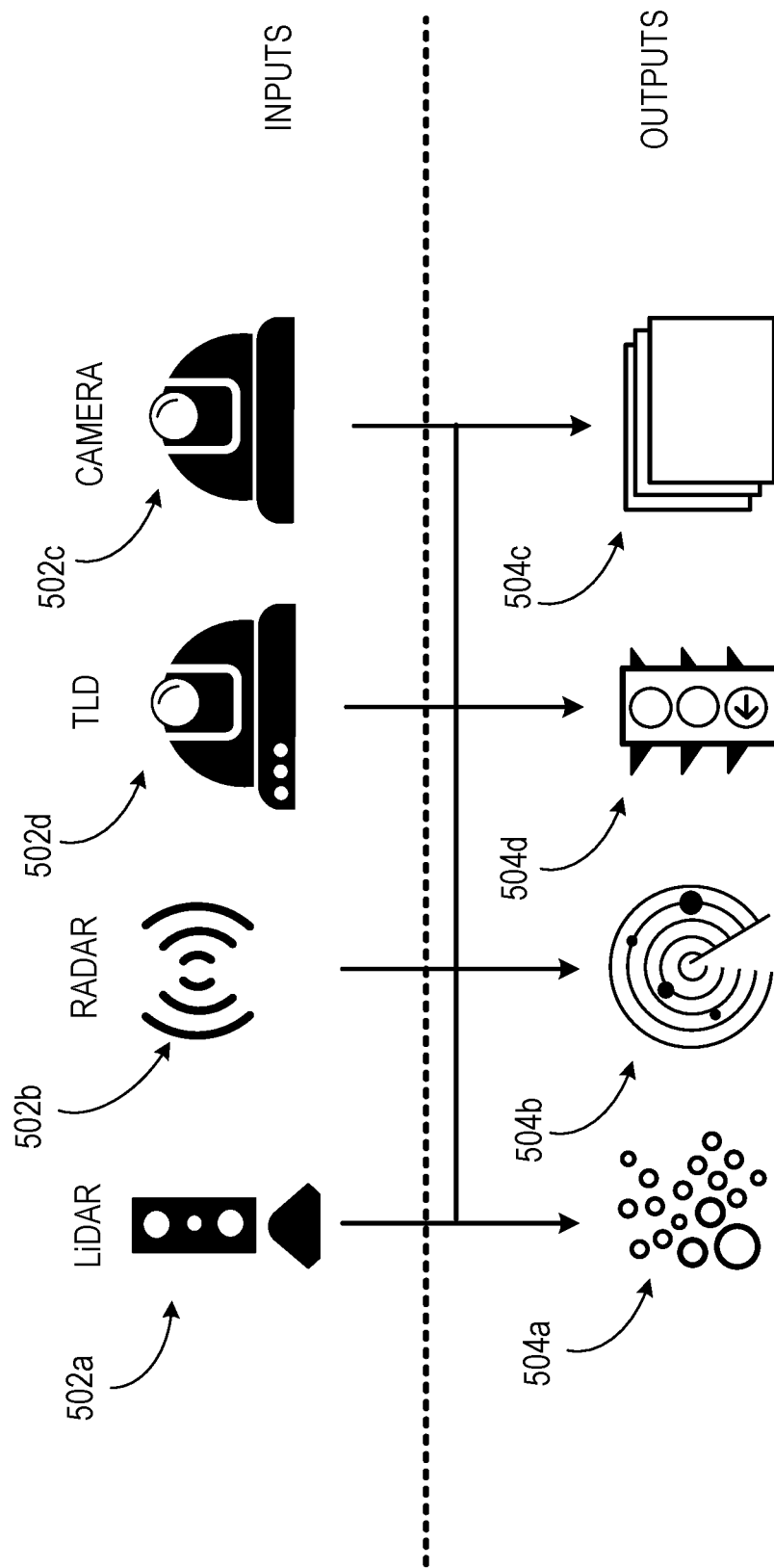
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6A:
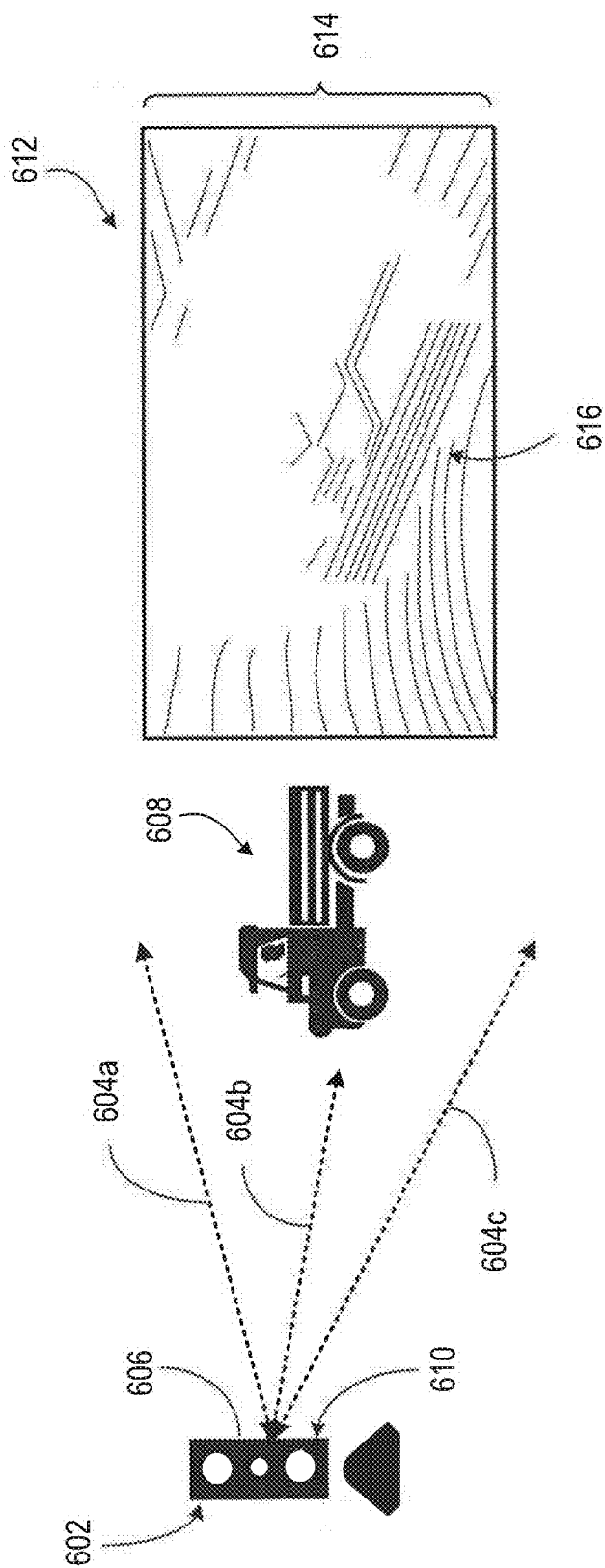
FIG. 6A shows an example of a LiDAR system.

FIG. 6A shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 6B:
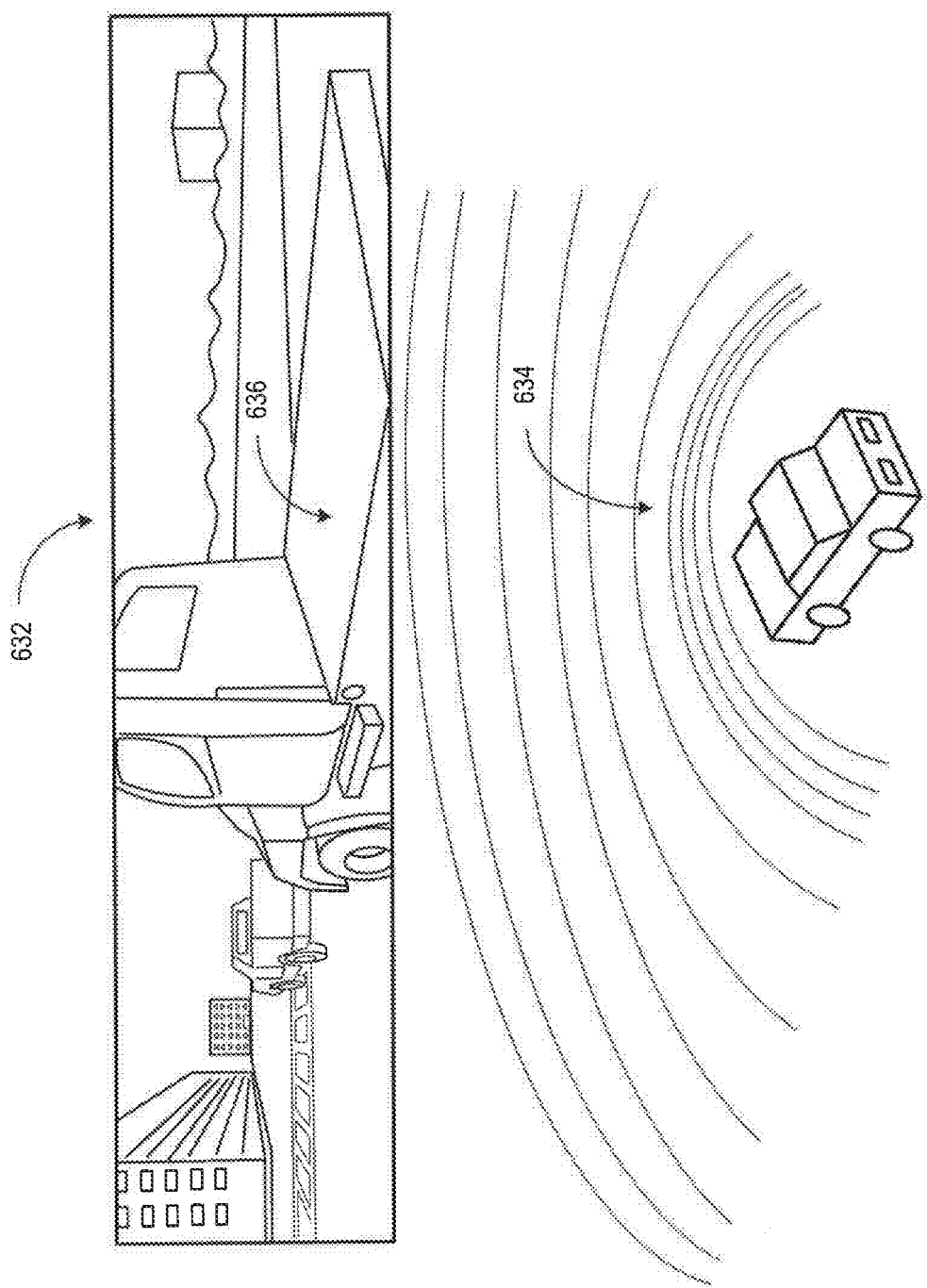
FIG. 6B shows the LiDAR system in operation.

FIG. 6B shows the LiDAR system 602 in operation. In the scenario shown in this figure, the AV 100 receives both camera system output 504c in the form of an image 632 and LiDAR system output 504a in the form of LiDAR data points 634. In use, the data processing systems of the AV 100 compares the image 632 to the data points 634. In particular, a physical object 636 identified in the image 632 is also identified among the data points 634. In this way, the AV 100 perceives the boundaries of the physical object based on the contour and density of the data points 634.

Figure 6C:
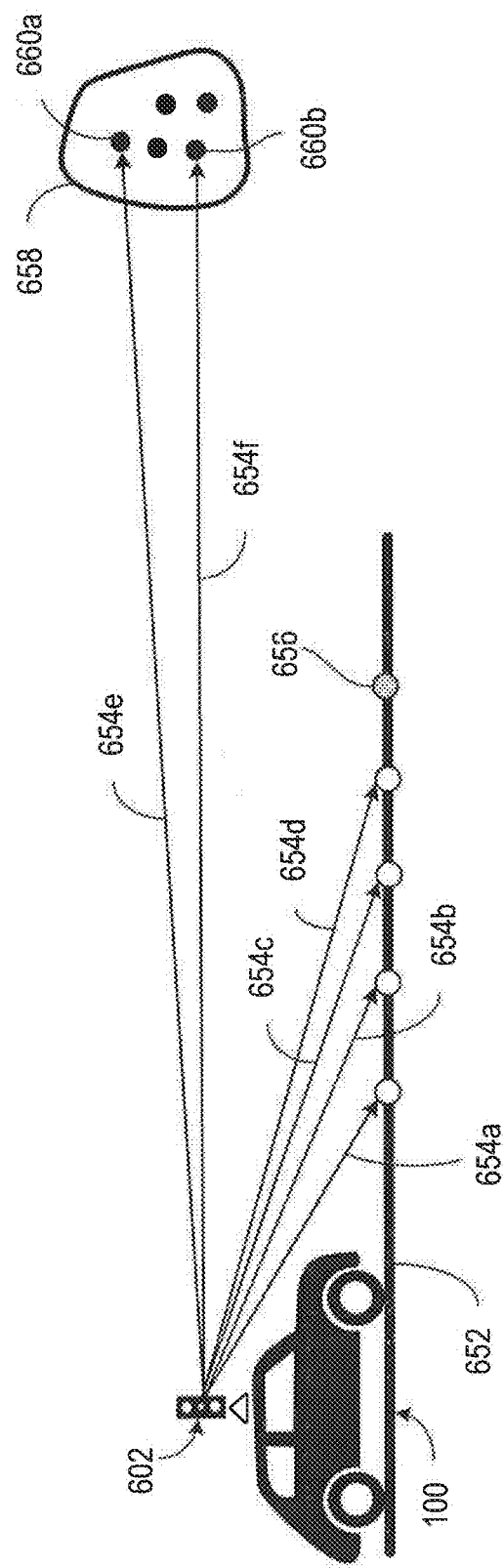
FIG. 6C shows the operation of the LiDAR system in additional detail.

FIG. 6C shows the operation of the LiDAR system 602 in additional detail. As described above, the AV 100 detects the boundary of a physical object based on characteristics of the data points detected by the LiDAR system 602. As shown in FIG. 6C, a flat object, such as the ground 652, will reflect light 654a-d emitted from a LiDAR system 602 in a consistent manner. Put another way, because the LiDAR system 602 emits light using consistent spacing, the ground 652 will reflect light back to the LiDAR system 602 with the same consistent spacing. As the AV 100 travels over the ground 652, the LiDAR system 602 will continue to detect light reflected by the next valid ground point 656 if nothing is obstructing the road. However, if an object 658 obstructs the road, light 654e-f emitted by the LiDAR system 602 will be reflected from points 660a-b in a manner inconsistent with the expected consistent manner. From this information, the AV 100 can determine that the object 658 is present.

Path Planning

Figure 7:
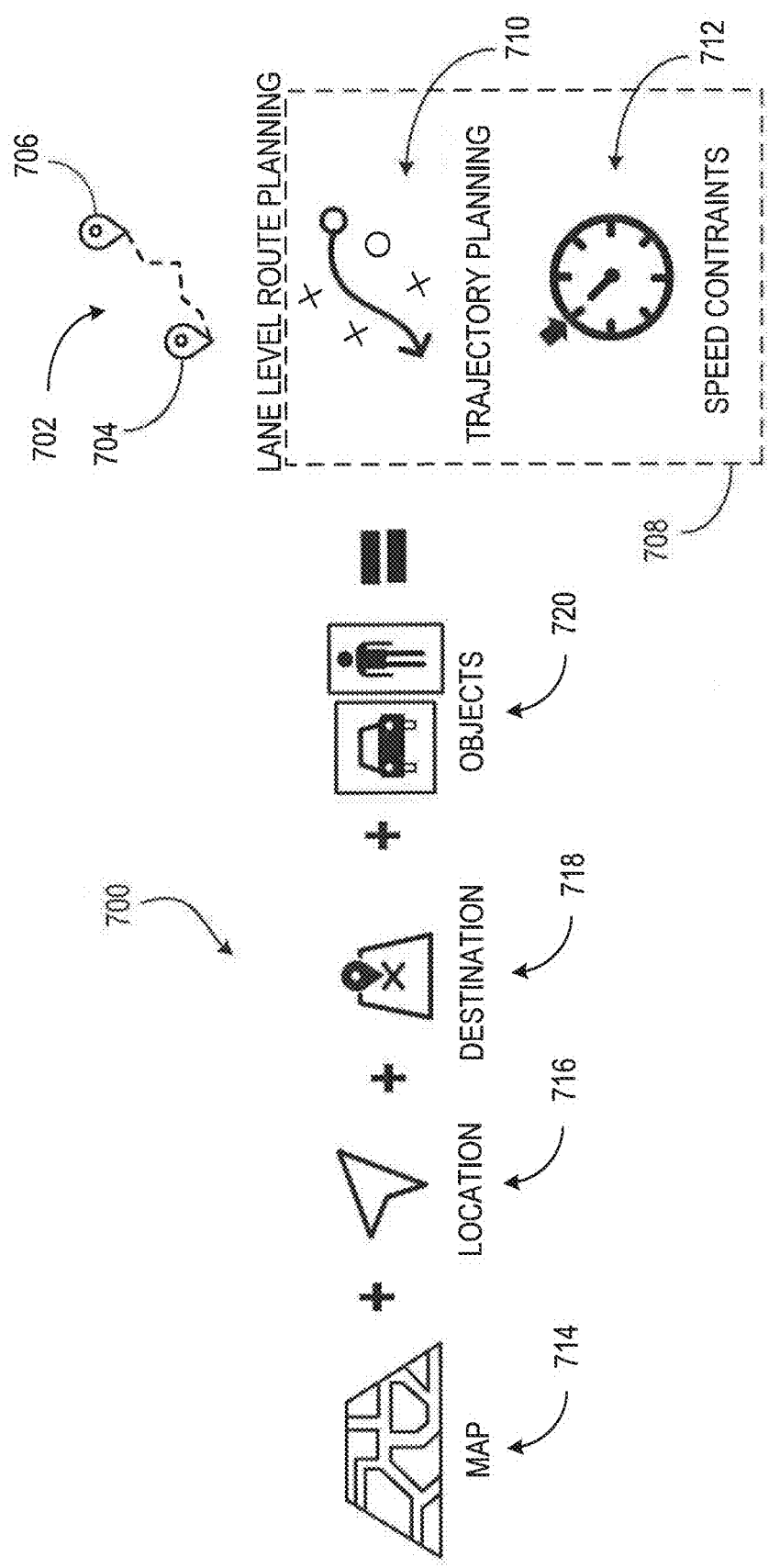
FIG. 7 shows a block diagram of the relationships between inputs and outputs of a planning module.

FIG. 7 shows a block diagram 700 of the relationships between inputs and outputs of a planning module 404 (e.g., as shown in FIG. 4). In general, the output of a planning module 404 is a route 702 from a start point 704 (e.g., source location or initial location), and an end point 706 (e.g., destination or final location). The route 702 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 702 includes "off-road" segments such as unpaved paths or open fields.

In addition to the route 702, a planning module also outputs lane-level route planning data 708. The lane-level route planning data 708 is used to traverse segments of the route 702 based on conditions of the segment at a particular time. For example, if the route 702 includes a multi-lane highway, the lane-level route planning data 708 includes trajectory planning data 710 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 708 includes speed constraints 712 specific to a segment of the route 702. For example, if the segment includes pedestrians or unexpected traffic, the speed constraints 712 may limit the AV 100 to a travel speed slower than an expected speed, e.g., a speed based on speed limit data for the segment.

In an embodiment, the inputs to the planning module 404 includes database data 714 (e.g., from the database module 410 shown in FIG. 4), current location data 716 (e.g., the AV position 418 shown in FIG. 4), destination data 718 (e.g., for the destination 412 shown in FIG. 4), and object data 720 (e.g., the classified objects 416 as perceived by the perception module 402 as shown in FIG. 4). In some embodiments, the database data 714 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 8:
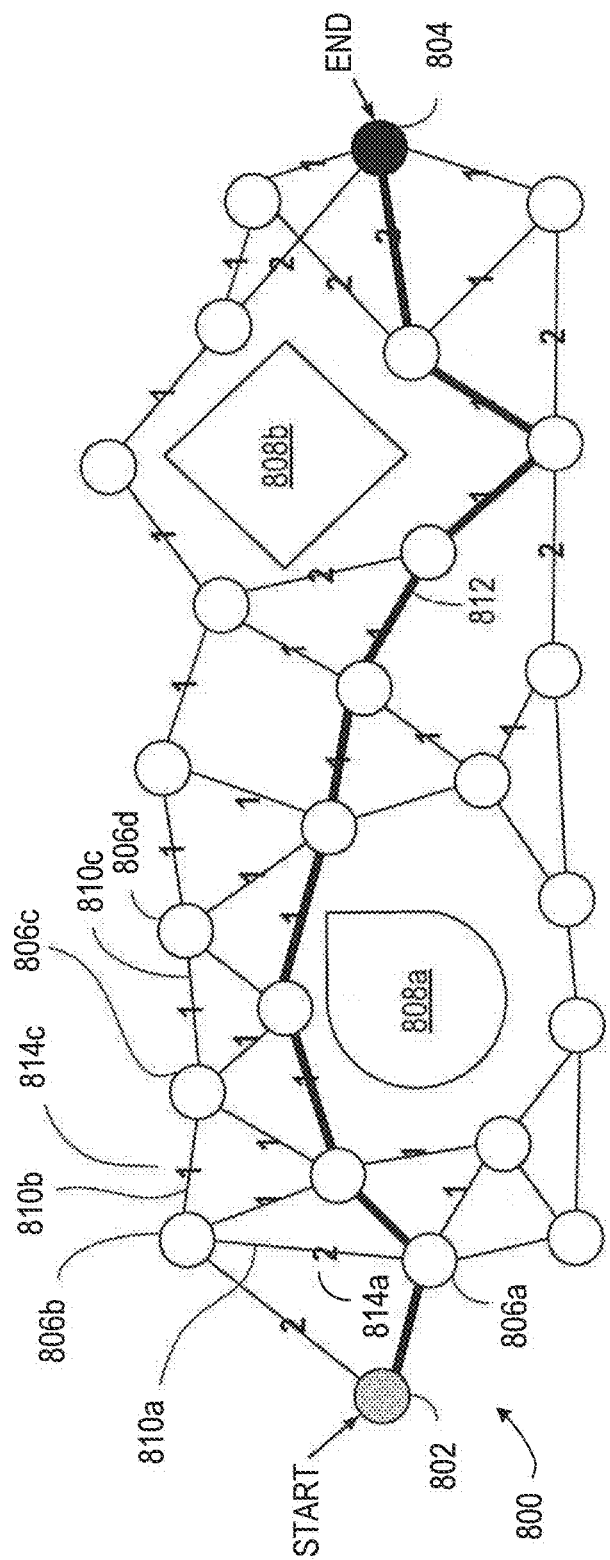
FIG. 8 shows an undirected graph used in path planning.

FIG. 8 shows a directed graph 800 used in path planning, e.g., by the planning module 404 (FIG. 4). In general, a directed graph 800 like the one shown in FIG. 8 is used to determine a path between any start point 802 and end point 804. In real-world terms, the distance separating the start point 802 and end point 804 may be relatively large (e.g., in two different metropolitan areas) or may be relatively small (e.g., two intersections abutting a city block or two lanes of a multi-lane road).

In an embodiment, the directed graph 800 has nodes 806a-d representing different locations between the start point 802 and the end point 804 that could be occupied by an AV 100. In some examples, e.g., when the start point 802 and end point 804 represent different metropolitan areas, the nodes 806a-d represent segments of roads. In some examples, e.g., when the start point 802 and the end point 804 represent different locations on the same road, the nodes 806a-d represent different positions on that road. In this way, the directed graph 800 includes information at varying levels of granularity. In an embodiment, a directed graph having high granularity is also a subgraph of another directed graph having a larger scale. For example, a directed graph in which the start point 802 and the end point 804 are far away (e.g., many miles apart) has most of its information at a low granularity and is based on stored data, but also includes some high granularity information for the portion of the graph that represents physical locations in the field of view of the AV 100.

The nodes 806a-d are distinct from objects 808a-b which cannot overlap with a node. In an embodiment, when granularity is low, the objects 808a-b represent regions that cannot be traversed by automobile, e.g., areas that have no streets or roads. When granularity is high, the objects 808a-b represent physical objects in the field of view of the AV 100, e.g., other automobiles, pedestrians, or other entities with which the AV 100 cannot share physical space. In an embodiment, some or all of the objects 808a-b are a static objects (e.g., an object that does not change position such as a street lamp or utility pole) or dynamic objects (e.g., an object that is capable of changing position such as a pedestrian or other car).

The nodes 806a-d are connected by edges 810a-c. If two nodes 806a-b are connected by an edge 810a, it is possible for an AV 100 to travel between one node 806a and the other node 806b, e.g., without having to travel to an intermediate node before arriving at the other node 806b. (When we refer to an AV 100 traveling between nodes, we mean that the AV 100 travels between the two physical positions represented by the respective nodes.) The edges 810a-c are often bidirectional, in the sense that an AV 100 travels from a first node to a second node, or from the second node to the first node. In an embodiment, edges 810a-c are unidirectional, in the sense that an AV 100 can travel from a first node to a second node, however the AV 100 cannot travel from the second node to the first node. Edges 810a-c are unidirectional when they represent, for example, one-way streets, individual lanes of a street, road, or highway, or other features that can only be traversed in one direction due to legal or physical constraints.

In an embodiment, the planning module 404 uses the directed graph 800 to identify a path 812 made up of nodes and edges between the start point 802 and end point 804.

An edge 810a-c has an associated cost 814a-b. The cost 814a-b is a value that represents the resources that will be expended if the AV 100 chooses that edge. A typical resource is time. For example, if one edge 810a represents a physical distance that is twice that as another edge 810b, then the associated cost 814a of the first edge 810a may be twice the associated cost 814b of the second edge 810b. Other factors that affect time include expected traffic, number of intersections, speed limit, etc. Another typical resource is fuel economy. Two edges 810a-b may represent the same physical distance, but one edge 810a may require more fuel than another edge 810b, e.g., because of road conditions, expected weather, etc.

When the planning module 404 identifies a path 812 between the start point 802 and end point 804, the planning module 404 typically chooses a path optimized for cost, e.g., the path that has the least total cost when the individual costs of the edges are added together.

Autonomous Vehicle Control

Figure 9:
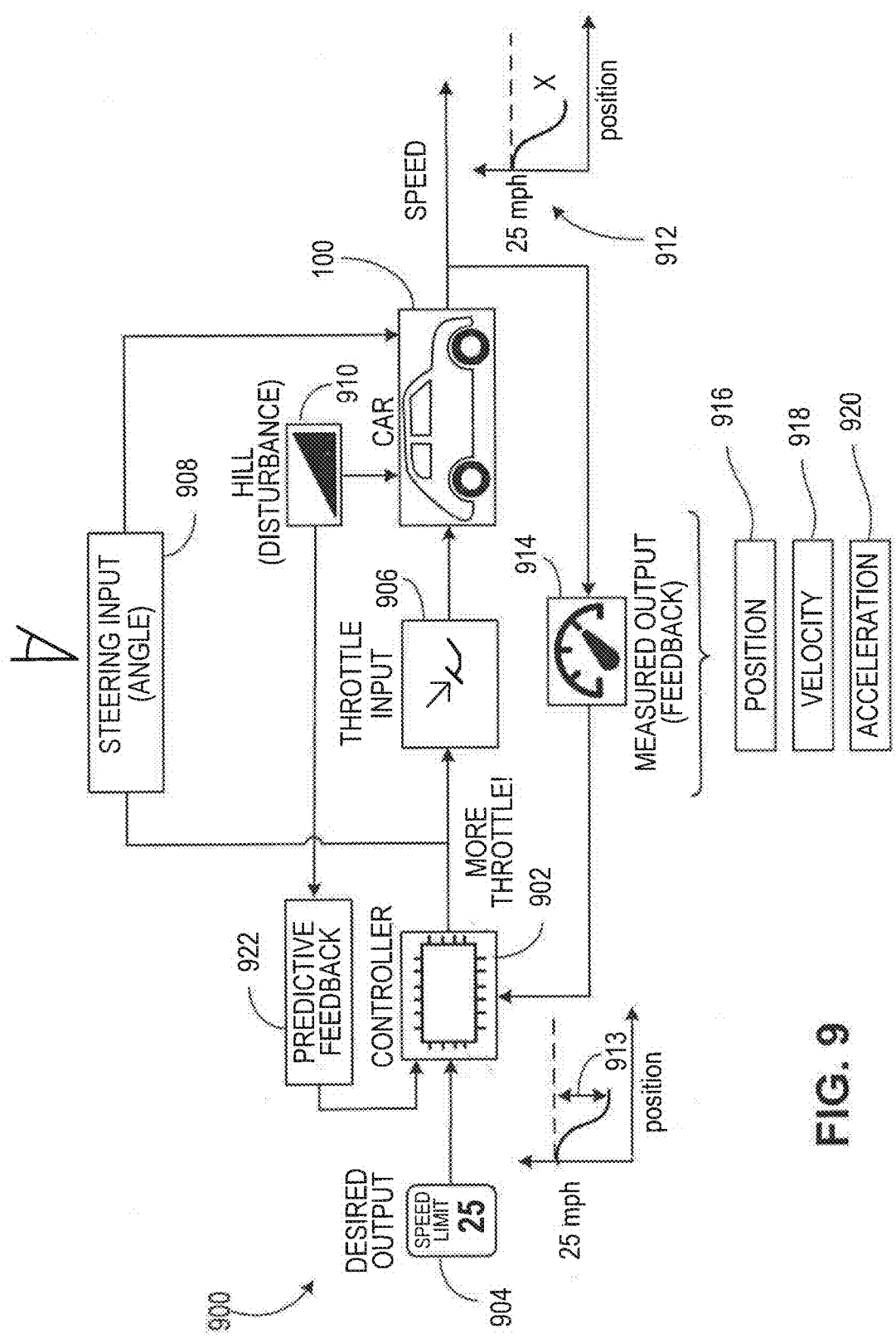
FIG. 9 shows a block diagram of the inputs and outputs of a control module.

FIG. 9 shows a block diagram 900 of the inputs and outputs of a control module 406 (e.g., as shown in FIG. 4). A control module operates in accordance with a controller 902 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 902 when the instructions are executed (e.g., by the one or more processors).

In an embodiment, the controller 902 receives data representing a desired output 904. The desired output 904 typically includes a velocity, e.g., a speed and a heading. The desired output 904 can be based on, for example, data received from a planning module 404 (e.g., as shown in FIG. 4). In accordance with the desired output 904, the controller 902 produces data usable as a throttle input 906 and a steering input 908. The throttle input 906 represents the magnitude in which to engage the throttle (e.g., acceleration control) of an AV 100, e.g., by engaging the steering pedal, or engaging another throttle control, to achieve the desired output 904. In some examples, the throttle input 906 also includes data usable to engage the brake (e.g., deceleration control) of the AV 100. The steering input 908 represents a steering angle, e.g., the angle at which the steering control (e.g., steering wheel, steering angle actuator, or other functionality for controlling steering angle) of the AV should be positioned to achieve the desired output 904.

In an embodiment, the controller 902 receives feedback that is used in adjusting the inputs provided to the throttle and steering. For example, if the AV 100 encounters a disturbance 910, such as a hill, the measured speed 912 of the AV 100 is lowered below the desired output speed. In an embodiment, any measured output 914 is provided to the controller 902 so that the necessary adjustments are performed, e.g., based on the differential 913 between the measured speed and desired output. The measured output 914 includes measured position 916, measured velocity 918, (including speed and heading), measured acceleration 920, and other outputs measurable by sensors of the AV 100.

In an embodiment, information about the disturbance 910 is detected in advance, e.g., by a sensor such as a camera or LiDAR sensor, and provided to a predictive feedback module 922. The predictive feedback module 922 then provides information to the controller 902 that the controller 902 can use to adjust accordingly. For example, if the sensors of the AV 100 detect ("see") a hill, this information can be used by the controller 902 to prepare to engage the throttle at the appropriate time to avoid significant deceleration.

Figure 10:
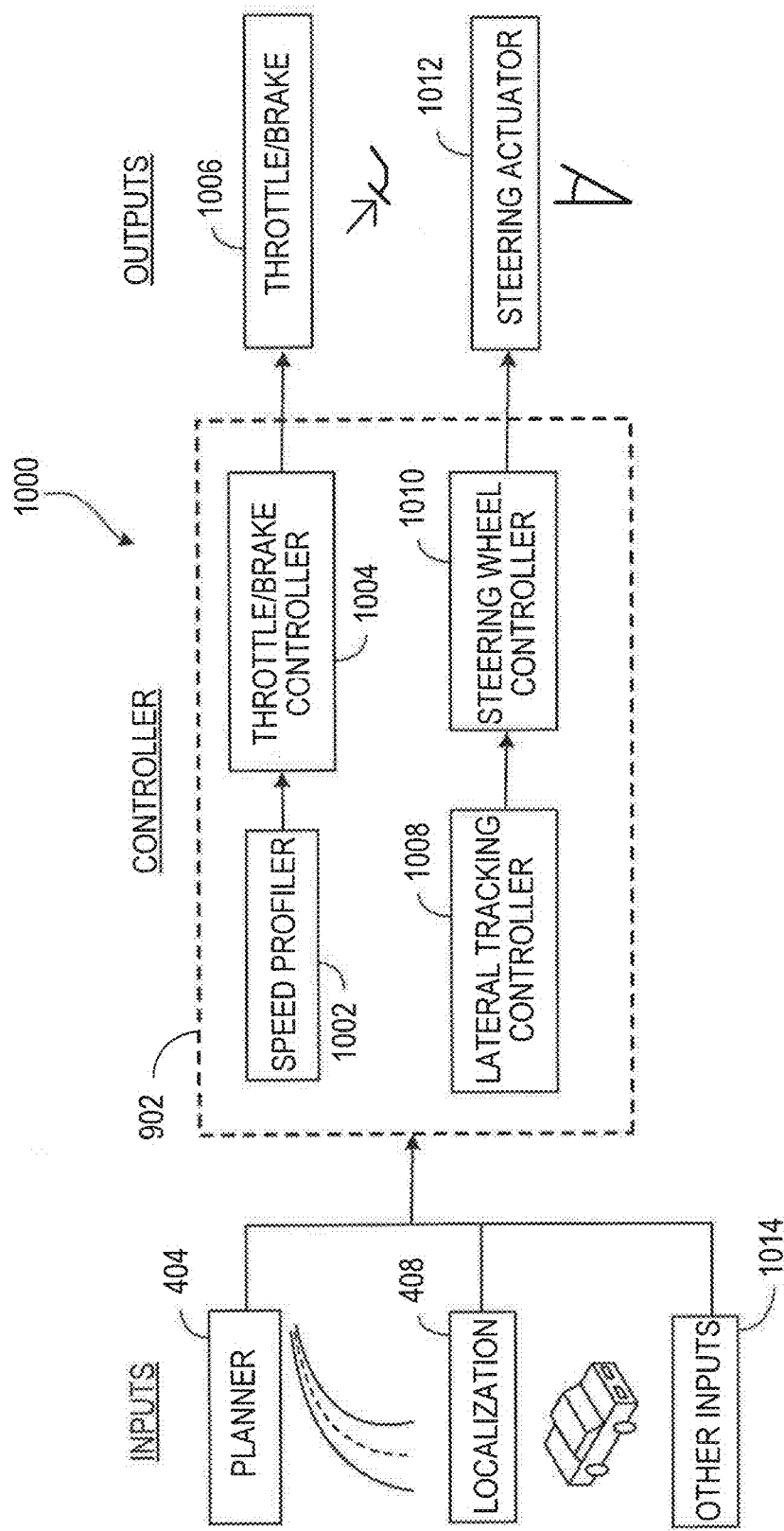
FIG. 10 shows a block diagram of the inputs, outputs, and components of a controller.

FIG. 10 shows a block diagram 1000 of the inputs, outputs, and components of the controller 902. The controller 902 has a speed profiler 1002 which affects the operation of a throttle/brake controller 1004. For example, the speed profiler 1002 instructs the throttle/brake controller 1004 to engage acceleration or engage deceleration using the throttle/brake 1006 depending on, e.g., feedback received by the controller 902 and processed by the speed profiler 1002.

The controller 902 also has a lateral tracking controller 1008 which affects the operation of a steering controller 1010. For example, the lateral tracking controller 1008 instructs the steering controller 1004 to adjust the position of the steering angle actuator 1012 depending on, e.g., feedback received by the controller 902 and processed by the lateral tracking controller 1008.

The controller 902 receives several inputs used to determine how to control the throttle/brake 1006 and steering angle actuator 1012. A planning module 404 provides information used by the controller 902, for example, to choose a heading when the AV 100 begins operation and to determine which road segment to traverse when the AV 100 reaches an intersection. A localization module 408 provides information to the controller 902 describing the current location of the AV 100, for example, so that the controller 902 can determine if the AV 100 is at a location expected based on the manner in which the throttle/brake 1006 and steering angle actuator 1012 are being controlled. In an embodiment, the controller 902 receives information from other inputs 1014, e.g., information received from databases, computer networks, etc.

Field Theory Based Perception

Figure 11:
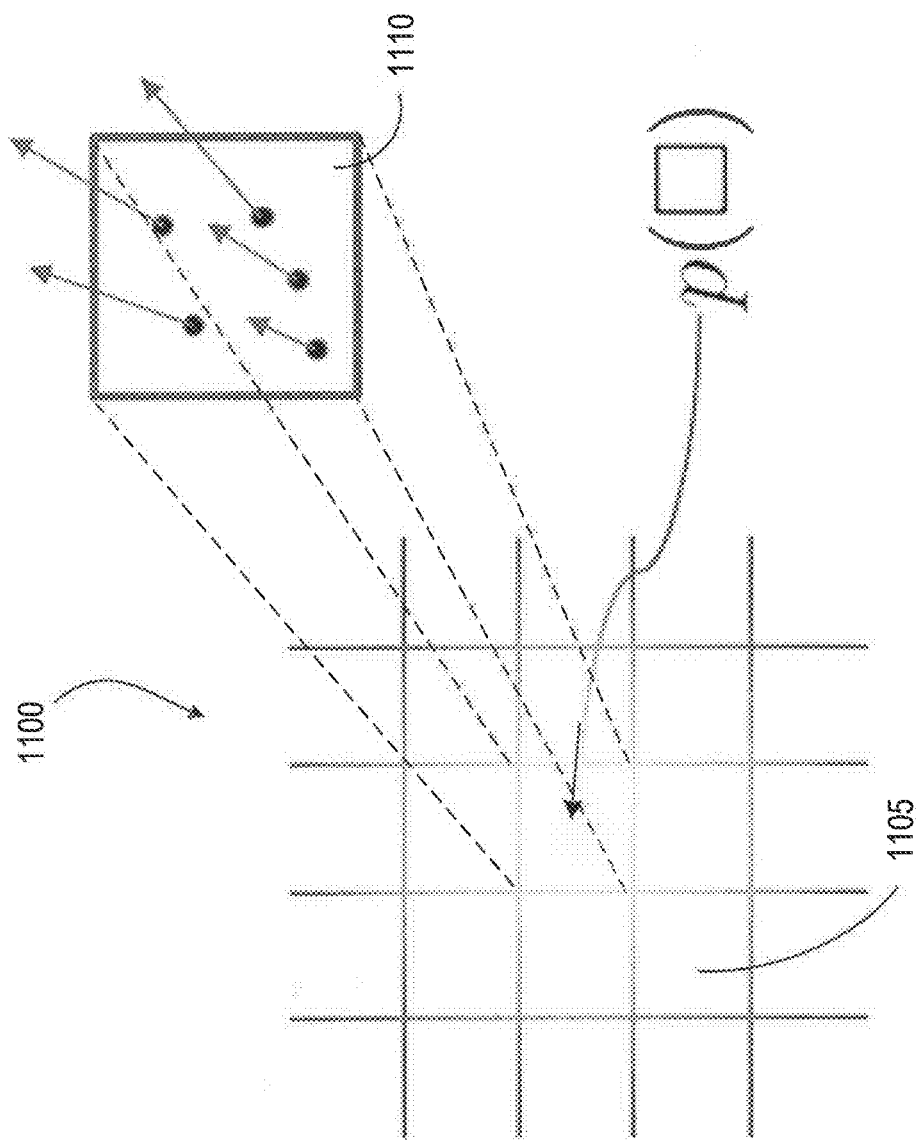
FIG. 11 illustrates a discretized representation of an environment of an autonomous vehicle, with particles representing an object or free space in a particular cell.

In an embodiment, the classified objects 416 as perceived by the perception module 402 (FIG. 4) are positioned on a discretized representation of the environment of the AV. An example of such a discretized representation 1100 is shown in FIG. 11. In this example, the discretized representation 1100 includes a grid map with multiple individual cells 1105 (also referred to as grid cells) that each represents a unit area (or volume) of the environment. In some implementations, the perception module 402 is configured to update an occupancy probability of such individual grid cells, the occupancy probabilities representing likelihoods of presence of one or more of the classified objects in the individual cells. For example, the occupancy state of each grid cell in a discretized representation of the vehicle's environment can be computed, e.g., using a Bayesian filter to recursively combine new sensor measurements with a current estimate of a posterior probability for the corresponding grid cell. Such dynamically updated grid maps are often referred to as a dynamic occupancy grid. The method assumes the environment is dynamically changing, and the dynamics of the environment is described by a Newtonian motion model. Therefore, the method estimates not only the occupancy, but also parameters of the dynamical model, such as, for example, velocities, forces, etc.

Occupancy grid maps divide the environment of an autonomous vehicle into a collection of individual grid cells, and the probabilities of occupancy of individual grid cells are computed. In some implementations, the cells are generated by dividing a map (or a driving environment) based on a Cartesian grid, a polar coordinate system, a structured mesh, a block structured mesh, or an unstructured mesh. In some implementations, the cells are generated by regularly or irregularly sampling a map (or a driving environment), e.g., by an unstructured mesh where cells may be triangles, quadrilaterals, pentagons, hexagons, or any other polygon or a combination of various polygons for a 2-dimensional mesh. Similarly, the cells can be an irregular tetrahedron, a hexahedron, or any other polytope or a combination of polytopes for a 3-dimensional mesh. In unstructured meshes the relation between cells is determined by common vertices that the cells may share. For example, two triangles defined as two sets of vertex indices [a, b, c] and [b, c, e] share a common edge which is defined as a line segment between vertices b and c. In some implementations, the cells can be described by a graph, where each cell corresponds to a node and two adjacent cells are characterized by an edge on the graph. An edge may be assigned a value representing a dynamic interaction (described below) between the linked two nodes/cells. Each grid cell can be considered to be in one of two states—occupied or free. Referring to FIG. 11, the probability of a given cell being empty is denoted as $p(\square)$. The states of the grid cells are updated based on sensor observations. This can be done, for example, using an inverse sensor model that assigns a discrete, binary occupancy probability $p_{z_{t+1}}(o_{t+1}|z_{t+1})$ to each grid cell based on a measurement $z_{t+1}$ at time t+1. The use of such inverse sensor models however may require an assumption of a static environment which may not be a realistic assumption for AVs. The dynamic state of grid cells can be addressed, for example, by modeling objects such as vehicles or pedestrians as a collection of particles, akin to how fluid is modeled in filed theory-based fluid dynamics. The term particles, as used herein, do not refer to physical units of matter. Rather, the particles represent a set of interacting software components, such that the software components together form a virtual representation of objects (e.g., vehicles, pedestrians, etc.) and free space in the environment of an AV. In some implementations, each software component is data that represents an instantiation of a unit of a conceptual object. Referring again to FIG. 11, a magnified inset of the grid cell 1110 illustrates multiple particles 1115 representing the contents of the grid cell 1110. Each of the particles 1115 can be associated with one or more parameters that represent the state of the corresponding particle. For example, the state of the particle can be represented by one or more of: a velocity (velocity along one or more of x direction, y direction, z direction), covariances associated with the multiple velocities, and a force acting on the particle. Such parameters can account for various dynamic characteristics of the particles. For example, a force parameter allows accounting for dynamics along a curved road or that of an accelerating vehicle etc.

In such field-theory based modeling, the number of particles in a particular grid cell, or the sum of particle weights in a particular grid cell can represent a measure for the occupancy probability of the corresponding grid cell. However, such grid-cell specific approach requires tracking each of the individual particles in a given grid cell, and in some cases, this can present a significant computational burden. For example, to obtain a 28 bit accuracy without the technology described herein, tracking of $2^{28}$ particles per grid may be needed, which entails a computational burden that may not be achievable in many AV applications. The technology described herein can improve field-theory based perception models by avoiding large computation burdens. Specifically, instead of tracking individual particles to determine the occupancy of cells, the technology described herein computes probability of occupancy of the cells by tracking statistics of particle density functions. In other words, the states of the grid cells in this approach depend on one or more parameters of a joint distribution of the particles as they traverse the grid cells. An Eulerian solver or a Lagrangian solver is used to determine the time-varying joint distributions by computing solutions to differential equations defined on the one or more particle-dynamics parameters obtained using one or more sensors. The resulting updated particle density functions are used in conjunction with forward sensor models associated with the corresponding sensors to generate predictions on probability of occupancy of various grid cells.

As described above, the probability of a given cell being empty is denoted as p(□). In addition, the technology described herein assumes that for two disjoint volumes $□_1$ and $□_2$, the probabilities of their respective occupancies (or that of being empty) are uncorrelated. This can be represented as:

$$p(□_1 ∪ □_2) = p(□_1)P(□_2)$$

From these assumptions, −log(p(□)) is defined an additive measure on the state space, and a density function ƒ(x) can be defined as being associated with the measure as follows:

$$p(□) = \exp(-\int_□ f(x)dx) \qquad (1)$$

This can be interpreted as the probability density function of $\int_v f(x)dx$ number of identically distributed and independent particles inside a volume V of the state space. Notably, because particles are considered to be identical, another inherent assumption of the technology described herein is that sensor measurements cannot be used to distinguish between particles. Rather, sensor measurements are defined as a probability of observation γ given a particle is located at x. This measurement can be referred to as a forward sensor model, and denoted as p(γ|x). Also, because sensor data cannot distinguish between particles and the measurements can be taken from only one particle, the probability of observation γ, given the entire volume V of a grid cell in a discretized representation is occupied (a situation that is denoted as ■, for visual aid purposes) can be denoted as:

$$p(γ|■) = \int_v p(γ|x)dx \qquad (2)$$

For autonomous vehicle applications, the particles represent objects, free space etc., and are considered to be dynamic across the grid cells of the discretized representation. This is because the environment for a vehicle changes continuously, and the locations of particles with respect to the vehicle vary with time. To account for the particle dynamics, the particle density function can be defined on a multi-dimensional phase space. For example, in some implementations, the particle density function can be defined as the function ƒ(t,x,v) in a time-space-velocity coordinate frame. This function can represent a probability density of finding a particle at time t, at location x, and moving with velocity v. In some implementations, a probability density is empirically inferred from sensor data. In some implementations, a probability density modeled as a known probabilistic distribution (e.g., exponential family) or a mixture of two or more known probabilistic distributions. In some implementations, a probability density may not be modeled as a known distribution, but is purely characterized by sensor data. In some implementations, other particle dynamic parameters such as a force acting on a particle, velocities along one or more additional directions, covariances of multiple velocities etc. can be used in the time-varying particle density functions. Because the particles are not stationary, the particle density function evolves over time, and the time-variation of the particle density function can be computed by determining solutions to a set of differential equations defined on the parameters that make up the particle density function. In some implementations, the evolution of the particle density function over time can be modeled using kinetic equations such as Boltzmann equations for the probability density function. For example, from fundamental principles of particle number conservation, the following differential equation can be defined:

$$\frac{d}{dt}f(t, x(t), v(t)) = \frac{\partial f}{\partial t} + \frac{\partial f}{\partial x}\dot{x} + \frac{\partial f}{\partial v}\dot{v} \equiv 0. \qquad (3)$$

By evaluating time derivative of positions and velocity, a Boltzmann partial differential equation can be derived as follows:

$$\frac{\partial f}{\partial t} + v\frac{\partial f}{\partial x} + a\frac{\partial f}{\partial v} = 0 \qquad (4)$$

The dynamics described in the above equations is based on a Cartesian coordinate system, but it may be generalized on any coordinate systems. In some implementations, when describing the cells and their interactions by a graph, a gradient operator on the graph can be used to capture the Boltzmann equations.

Solving a multi-variable partial differential equation, such as the one provided in equation (4) can be computationally intensive, which can make the process undesirable for real-time applications such as that used for locating objects and free-space in the environment of an AV. To make the process less computationally intensive, and feasible for real-time AV applications, the technology described herein uses an Eulerian solver that computes the solutions to the differential equation using numerical approximation. The Eulerian solver operates by approximating the differential equation as an ordinary differential equation (ODE) with known initial values of a set of parameters, and uses a forward Euler method to predict the values of the parameters at a future time point.

Figure 12:
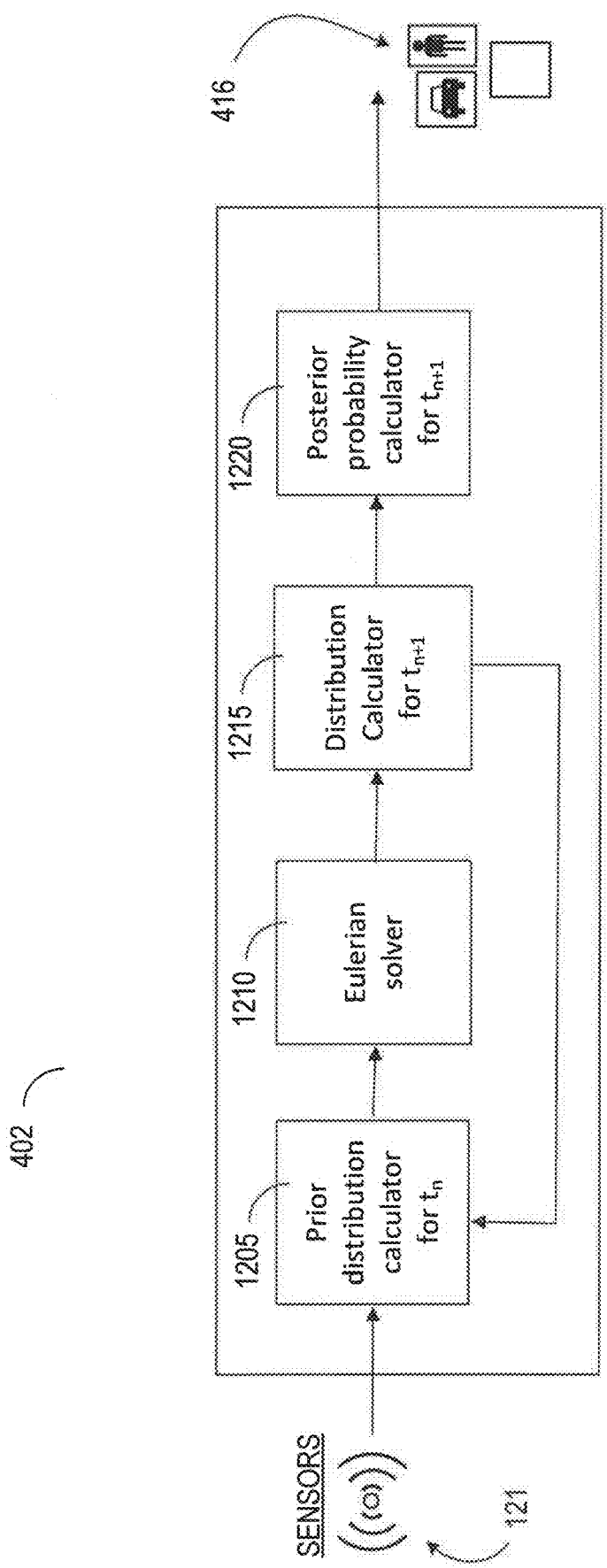
FIG. 12 is an example of a perception module that can be used to implement technology described herein.

FIG. 12 is an example of a perception module that can be used to implement technology described herein. In this example, the perception module 402 includes a prior distribution calculator 1205 that computes the particle density function at a particular time point $t_n$. This can be done, for example, using sensor data received from the one or more sensors 121. In some implementations, the sensor data can include radar and/or LiDAR information having information on one or more parameters pertaining to the particles. For example, the parameters can include one or more of a velocity of a particle along a particular direction as defined in accordance with a coordinate system governing the discretized representation of the environment, a force acting on a particle, a location of a particle etc. In some implementations, the prior distribution calculator 1205 can be configured to calculate one or more additional parameters based on the information received from the sensors 121. For example, if information on velocities along multiple directions (e.g., an x direction and y direction, and possibly also a z direction, as defined in accordance with a Cartesian coordinate system) is received from the sensors 121, the prior distribution calculator 1205 can be configured to calculate covariances of such velocities. In some implementations, when the received sensor information includes velocity information along x and y directions, the prior distribution calculator 1205 can generate an observation vector γ that includes the following parameters associated with particle dynamics: the density of particles in a cell ρ, velocity components $v_x$ and $v_y$, along x and y directions, respectively, and the corresponding covariances $\sigma_{xx}$, $\sigma_{xy}$, and $\sigma_{yy}$. The covariance terms are used to account for uncertainties in the velocity terms. In applications of field theory to fluid dynamics, anisotropic assumptions dictate that the particle velocities are equally uncertain in all directions. Such an assumption is unrealistic for objects in the environment of an AV, and therefore are accounted for specifically. For notational purposes, the particle density function is represented in this document as $f(t,x,v)$, $f(t,x(t),v(t))$, as denoted above, or $f(t,x,y,v)$ for two-dimensional discretized representations. In some embodiments, a polar coordinate system may be used, and the notation of the density distribution becomes $f(t,r,v)$, where r is the radius of location (x,y).

The observation can then be provided to an Eulerian solver or a Lagrangian solver 1210 to compute solutions to differential equations defined on the one or more parameters. The Eulerian solver can include one or more processing devices that are programmed to compute a numerical solution to the differential equations using forward Euler methods. This can include predicting the variations in the different parameters for a future time point $t_{n+1}$. As mentioned above, particle dynamics based processes that track individual particles within a cell to compute a probability of occupancy (p(γ|■)) are computationally intensive because in addition to the probability p(γ), such processes also require computations of individual p(■$_i$) for each cell i, as:

$$p(\blacksquare_i) = \frac{1}{p_i} \int_{\blacksquare_i} p(x, y),$$

wherein p(x,y) represents the particle density function for the particular cell. Using the Eulerian solver approach can significantly reduce the computational complexity, as compared to such processes, and generate images with higher quality (e.g., resolution) and dynamic range without significant burden to the computational resources.

The Eulerian solver predicts the evolution of the various parameters of the particles and provides such predicted values to a distribution calculator 1215 for time point $t_{n+1}$. The distribution calculator 1215 calculates the predicted distribution of the particle density function in substantially a similar way to that in the prior distribution calculator 1205, and generates an updated version of the particle density function $f(t,x,y,v)$. For notational ease though, the particle density function may also represented in this document as $f(t,x,v)$. The particle density function calculated by the distribution calculator 215 can be provided via a feedback loop to the prior distribution calculator 1205 to update the prior distribution.

The perception module 402 also includes a posterior probability calculator 1220 that computes the likelihood of a particle location being occupied at the future time point $t_{n+1}$, given the current observation vector γ. This is calculated by the posterior probability calculator 1220 as:

$$p(\bullet_{x,y} | \gamma) = \frac{p(\gamma | \bullet_{x,y})}{p(\gamma | \circ_{x,y})} \cdot f(t, x, y, v) \quad (5)$$

where the term $$\frac{p(\gamma | \bullet_{x,y})}{p(\gamma | \circ_{x,y})}$$

represents a forward sensor model and represents the probability of observation γ given that point (x,y) is occupied by an object with velocity v. The forward sensor models for various sensor modalities (e.g. LiDAR, RADAR, vision, and other sensor modalities) can be computed from annotated ground-truth data. The ground truth data can be collected, for example, by collecting the statistics of observations and occupancy information considering both as independent random samples. Such forward sensor models are used by the posterior probability calculator 1220 to condition the joint distribution of the parameters with respect to occupancy. In some implementations, the measurements and occupancy information are drawn from substantially continuous distributions. Such continuous distributions can be approximated by recording histograms by placing observation samples into appropriately spaced bins, and fitting an analytic density function to the discrete histogram.

In some implementations, forward sensor models can also be configured to detect fault conditions in sensors. For example, the ground truth data obtained from such models can be used to determine if the received sensor data is outside a range of expected values for that particular sensor by a threshold amount, and/or if the received data is inconsistent with data received for other sensors. If the sensor data from a particular sensor is determined to be out of the range by the threshold amount, a fault condition may be determined/flagged for that sensor, and the corresponding sensor inputs may be ignored until resolution of the fault condition.

The output generated by the posterior probability calculator 1220 is therefore a Bayesian estimate for the particle density function $f(t,x,y,v)$. In this function, $t \in \mathbb{R}_0^+$ represents time, (x,y) represents the location in a two-dimensional space W, and $v \in \mathbb{R}^2$ is the velocity vector at (x,y). This output may be queried in various ways across a discretized representation such as a dynamic occupancy grid. For example, a form of a query is to compute expected number of particles in a region of phase space plus time ($\Omega \subset \mathbb{R}_0^+ \times W \times \mathbb{R}^2$). In some implementations, this can be computed as:

$$\mathbb{E}[N] = \int_\Omega f(t,x,v) dt dx dv \quad (6)$$

Under the assumptions that particles are distributed identically and independently and the number of particles is very large, this yields that the probability of the region of phase space plus time being empty is given by:

$$P(\text{empty}(\Omega)) = \exp(-\mathbb{E}[N]) = \exp(-\int_\Omega f(t,x,v) dt dx dv) \quad (7)$$

The technology described herein can therefore be used in tracking not just objects, but also free space. This can be of importance to a planning module of an AV, for example, as information where the AV may be steered to. In some implementations, this information, possibly in conjunction with the information on the objects that the AV must steer away from, can improve the control of the AV, for example, by providing multiple possibilities.

In some implementations, one or more additional quantities can be defined to obtain more information from the particle density function. For example, for a set of points $\{p_i\}_{i=0}^n$, a closed polygon can be defined as a set of points in the world W such that a ray originating at any of this points intersects odd number of segments $\{[p_i, p_{(i+1) \bmod n}]\}_{i=0}^{n-1}$. This polygon can be denoted as P. In some implementations, a polygon can represent a grid cell of a discretized representation of an AV environment. However, notably, because the definition of the polygon is not dependent on any particular grid, the technology described herein can be implemented in a grid-agnostic manner. Further, it may be useful in some cases to define a conditional distribution $f(t_0, x, v)$ representing the particle density function at a specific point in time, an unconditional distribution $\rho(t,x) = \int_{\mathbb{R}^2} f(t,x,v)$ that represents particle density function in space and time regardless of their velocities, and a combination of both. Such quantities can be used to determine various quantities of interest for the operation of an AV. For example, the probability of a polygon P being occupied at a particular time t0 can be computed as:

$1 - \exp(-\int_P \rho(t_0, x) dx)$.

When considering multiple velocities (e.g., velocities along different directions), this can be extended, by defining another polygon $P_v$ in the vector space of velocities. Under this extension the probability of an object occupying a polygon Px and travelling with a velocity from Pv is given by:

$1 - \exp(-\int_{P_x \times P_v} f(t_0, x, v) dx dv)$.

In another example, various other probabilities, such as the probabilities of a space being occupied during a time interval can be computed using the particle density functions described above. Such probabilities, together with labeling on the particles can be used to identify various classified objects 416 including inanimate objects, persons, and free space, and how they move over time through the discretized representation of AV environment.

Prior to tracking the particle density functions over a discretized representation, the perception module 402 can define and label particles (pedestrians, cars, free space etc.), and assign an initial probability to individual grid cells. In some implementations, each cell is initially assumed to be occupied (e.g., via an assignment of a high probability of occupancy), and later updated based on sensor data. In some implementations, particles can be assigned different colors based on whether they represent objects (with additional color coding to differentiate between cars, pedestrians etc.) or free space. In some implementations, particles can be defined, labeled, and updated as interactive software components such as described in the document—Nuss et. al, "A Random Finite Set Approach for Dynamic Occupancy Grid Maps with Real-Time Application," International Journal of Robotics Research, Volume: 37 issue: 8, page(s): 841-866—the contents of which are incorporated herein by reference.

Figure 13A:
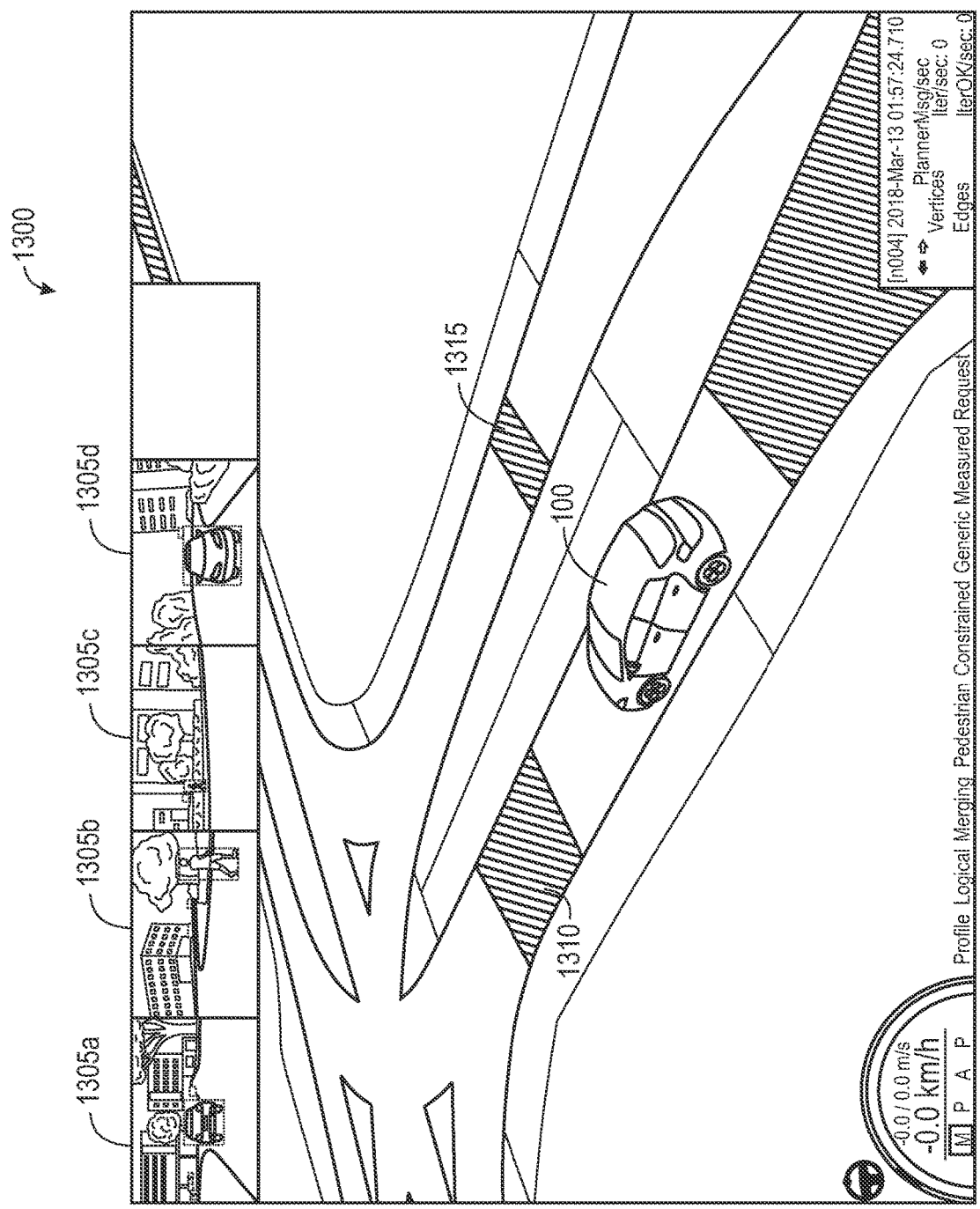
FIGS. 13A-13C show examples of user-interfaces generated based on output of a perception module in accordance with technology described herein.

FIG. 13A shows an example of a user-interface 1300 generated using outputs of a perception module operating in accordance with technology described herein. The interface 1300 shows multiple camera views 1305a-1305d, as well as the relative location of the AV 100 relative to various objects in the environment. Specifically, 1305 represents a front camera view, 1305b and 1305c represent side camera views, and 1305d represents a rear camera view. In this example, only the roads are considered to be part of the discretized representation of the environment, and particles are initialized over the corresponding grid cells. In this example, objects and free space are differently color coded. For example, the car visible in the front camera view 1305a is represented as the collection of particles 1310, and pedestrian visible in the side camera view 1305b is represented as the collection of particles 1315. The evolution of the collection of particles as they traverse the grid cells is tracked using field theory-based perception as described above.

Figure 13B:
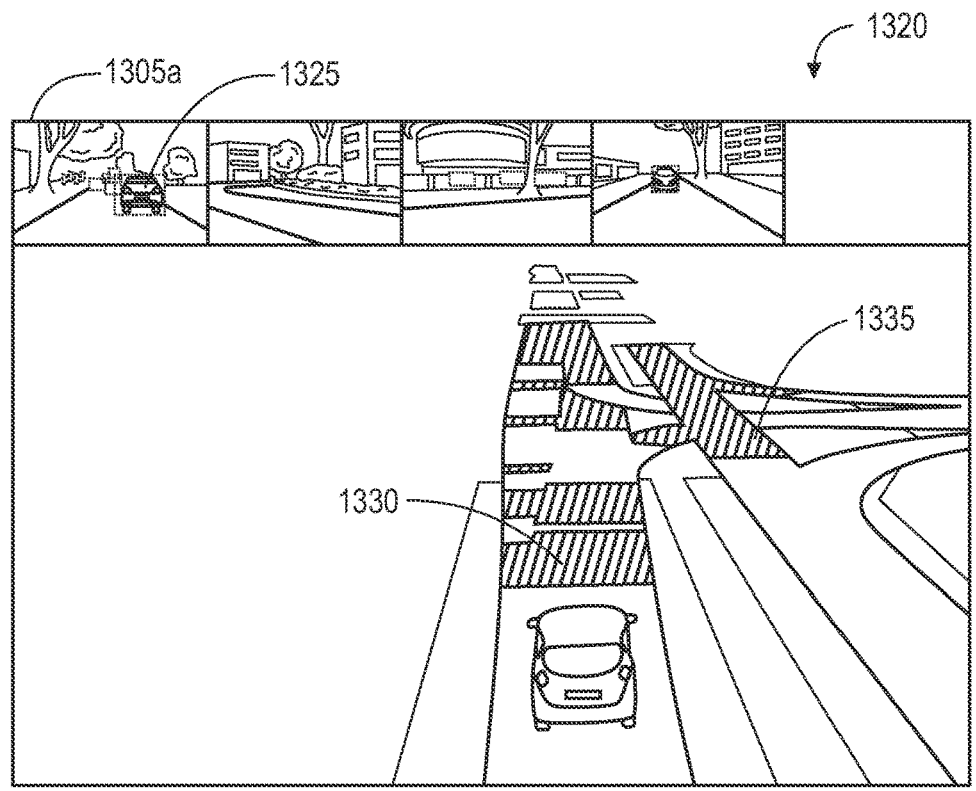
Figure 13C:
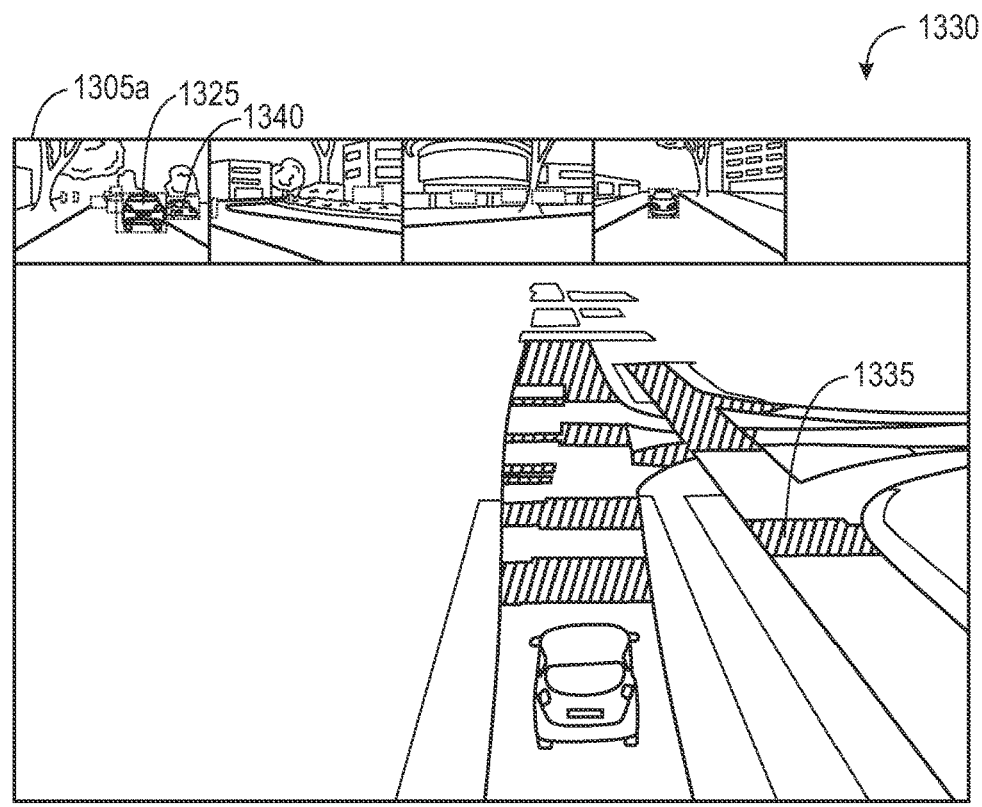

FIGS. 13B and 13C show examples of additional user-interfaces 1320 and 1330, respectively generated in accordance with technology described herein. Specifically the interface 1330 illustrates a time point that is less than a second later than the time point represented in the user interface 1330, and illustrates a major advantage of the technology described herein. As seen from the front camera view 1305a, the car 1325 (which corresponds to the collection of particles 1330) occludes the view of the object/objects that correspond to the collection of particles 1325. However, because the perception module is able to predict the evolution of the particles over the grid cell, the collection of particles 1335 is shown on the verge of separating from connected particles representing other objects. Indeed, as shown in FIG. 13C, less than a second later, another car 1340 is seen emerging from the portion occluded by the car 1325, and continues to be tracked as the evolution of the collection of particles 1335. Therefore, the technology described herein can be used to accurately track evolution of collections of particles even when some (and in some case, all) particles are occluded from view. Specifically, in the absence of sensor data missing one or more parameters related to a particle, a prior obtained value for the particle (or collection of particles) can be used in determining an update to the corresponding time-varying particle density function. This can provide significant advantages for the planning module by preemptively accounting for objects even before they come into the view of cameras.

Figure 14:
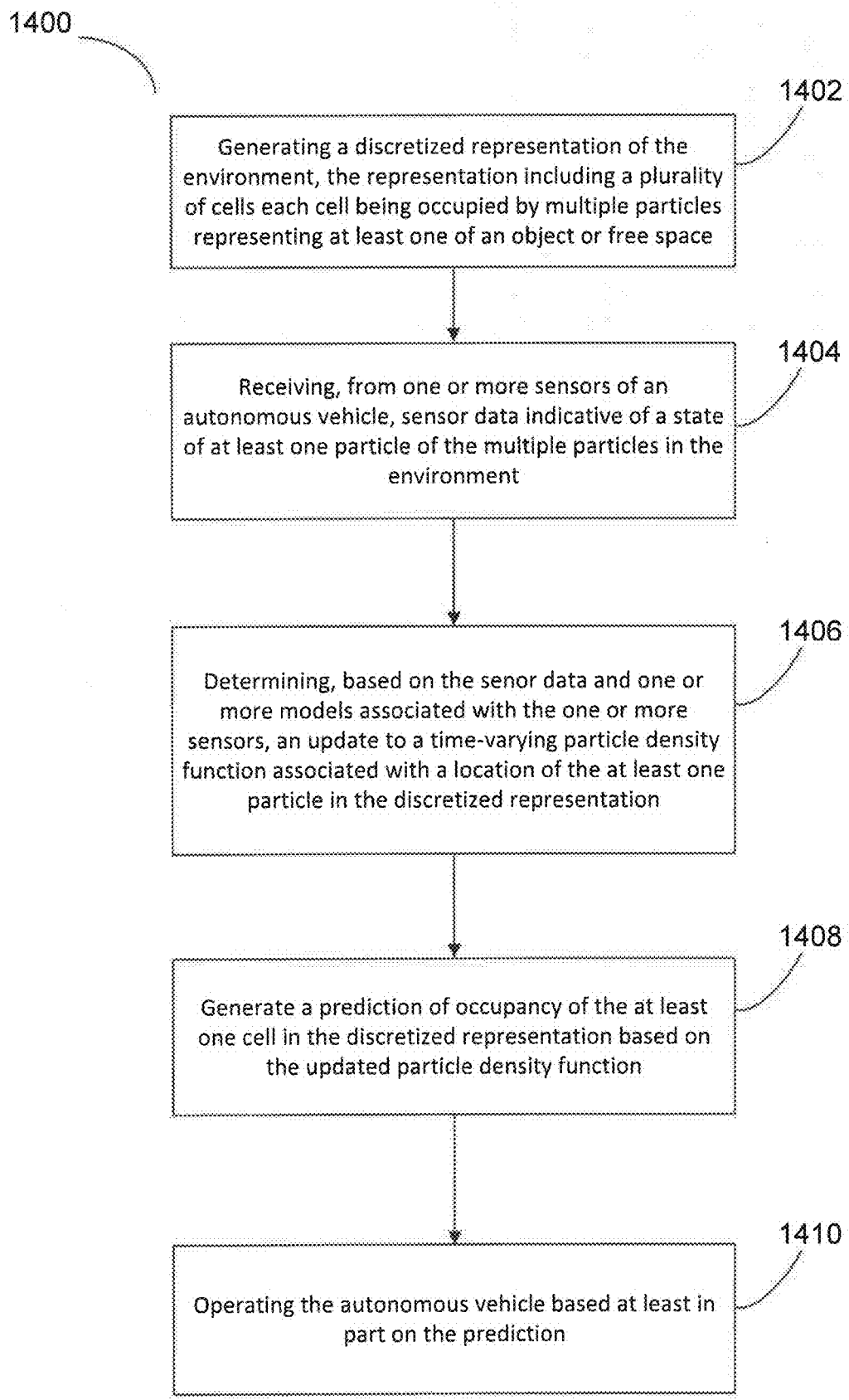
FIG. 14 is a flowchart of an example process for generating predictions of occupancy of locations in the environment of an autonomous vehicle.

FIG. 14 is a flowchart of an example process 1400 for generating predictions of occupancy of locations in the environment of an autonomous vehicle. In some implementations, at least a portion of the process 1400 can be executed at a perception module of an AV (e.g., the perception module 402 shown in FIG. 4) using, for example, one or more processing devices. Operations of the process 1400 includes generating a discretized representation of an environment in which the AV operates (1402). The discretized representation can include a plurality of cells (also referred to herein as grid cells). Each cell can be defined to be occupied by multiple particles representing at least one of: an object, or a free space in the environment. The particles are not physical units of matter, but are rather a set of interacting software components that represent virtual units of physical objects in accordance with principles of field theory in fluid dynamics. The discretized representation can include a grid defined using a Cartesian or polar coordinate system. In some implementations, the discretized representation can represent a dynamic occupancy grid.

In some implementations, each cell in the discretized representation is assigned an initial value of occupancy, which is then updated in accordance with an evolution of the particle density function. For example, the initial value or probability of occupancy may be assigned as 100% (or some other high value) to represent a safe assumption that all of the environment around the AV is occupied. The occupancy probability of the cells are then updated in accordance with an evolution of the particle density function and/or sensor data. In some implementations, labels are assigned to the multiple particles, each label indicating, for example, whether the corresponding particle represents an object or a free space. These labels can be updated in accordance with received sensor data. For example, if a car in front of the AV turns to the left or right, sensor data (and/or the evolution of the particle density function corresponding to the vehicle) can update one or more particles in the cells in front of the AV as free space.

Operations of the process 1400 also includes receiving, from one or more sensors of the AV, sensor data indicative of a state of at least one particle of the multiple particles in the environment (1404). The one or more sensors can include any combinations of the sensors 121 described above. The state of the particle can include for example, one or more velocities (e.g., velocities along different directions) associated with the particle, covariances associated with multiple velocities, and/or a force acting on the at least one particle. Considering force allows accounting for various dynamics of the corresponding objects or free space, for example, a motion of a vehicle along a curved path, an accelerating vehicle etc.

Operations of the process 1400 also includes determining an update to a time-varying particle density function associated with a location of the at least one particle in the dynamic occupancy grid from the sensor data and one or more models associated with the one or more sensors (1406). Determining the update to the time-varying particle density function can include determining, using an Eulerian solver or a Lagrangian solver, solutions to one or more differential equations defined on one or more parameters associated with the state of the at least one particle. The Eulerian solver can be substantially similar to the Eulerian solver 1210 described above with reference to FIG. 12. The one or more models can represent a sensor model trained to provide information on probabilities of occupancy of various cells of the discretized representation. The probabilities can be conditioned on corresponding sensor data, as described above, for example with reference to the forward sensor models. In some implementations, determining the update to the particle density function can include determining that the sensor data is missing at least one parameter indicative of the state of the at least one particle, and in response, using a prior value of the at least one parameter in determining the update to the time-varying particle density function. In some cases, this allows for updating particle density functions corresponding to locations that are occluded from the sensors.

Operations of the process 1400 also includes generating a prediction of occupancy of at least one cell in the discretized representation based on the updated particle density function (1408). This can include, for example, determining a probability of occupancy of the at least one cell as a product of (i) a ratio of conditional probabilities generated based on the sensor data and the one or more sensor models, and (ii) an updated time-varying particle density function for the at least one cell. The ratio of conditional probabilities can be a ratio of (i) a first probability of receiving the sensor data conditioned on the at least one cell being occupied and (ii) a second probability of receiving the sensor data conditioned on the at least one cell being unoccupied. The first and second probabilities can be determined using the one or more sensor models. In some implementations, the predictions can be generated, for example, in accordance with equation (5). Operations of the process 1400 also includes operating the AV using a controller circuit, based at least in part on the prediction (1410).

Figure 15:
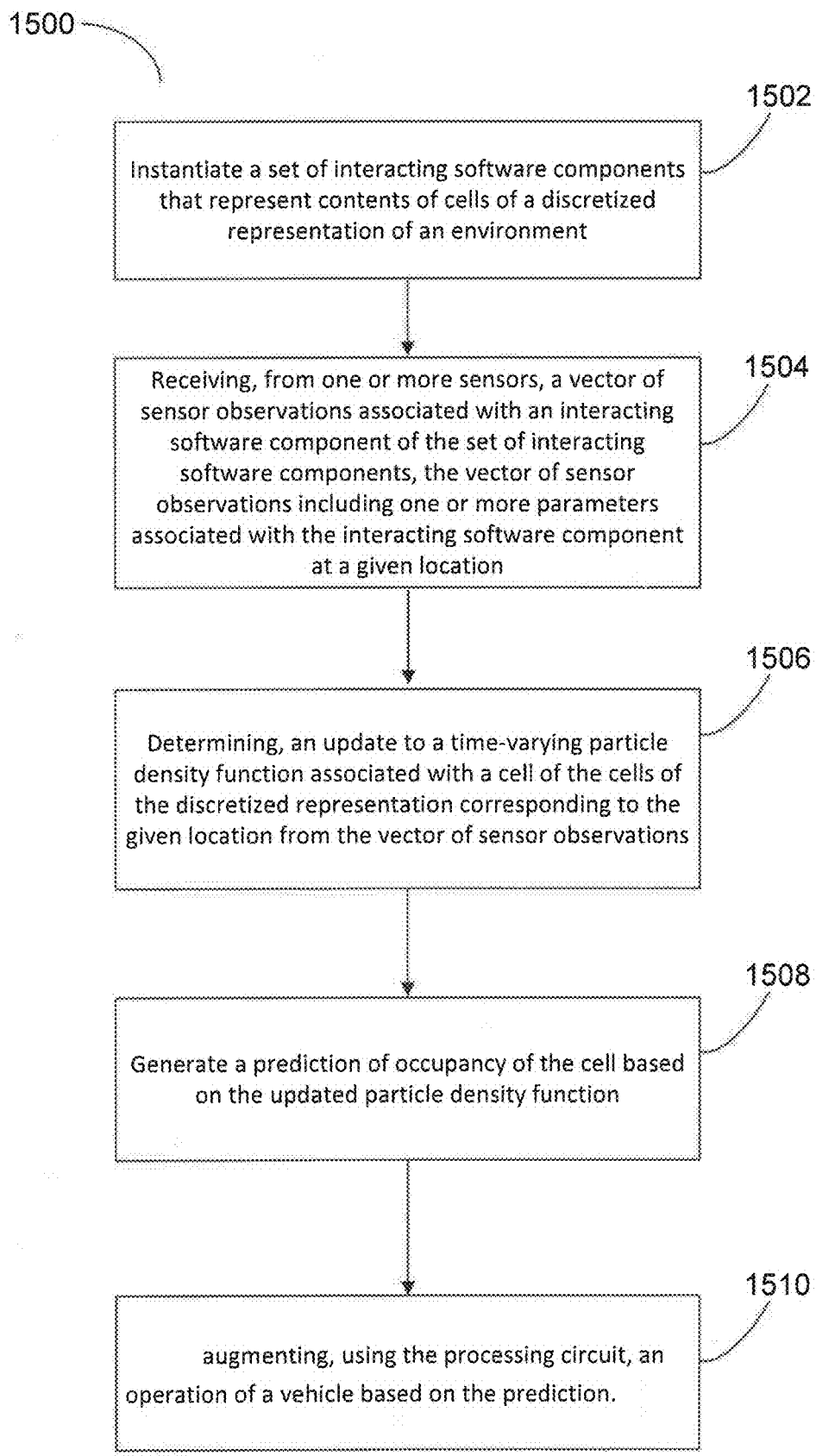
FIG. 15 is a flowchart of another example process for generating predictions of occupancy of locations in the environment of an autonomous vehicle.

FIG. 15 is a flowchart of an example process 1500 for generating predictions of occupancy of locations in the environment of an autonomous vehicle. In some implementations, at least a portion of the process 1500 can be executed at a perception module of an AV (e.g., the perception module 402 shown in FIG. 4) using, for example, one or more processing devices. In some implementations, at least a portion of the operations of the process 1500 can be executed by a processing circuit onboard one or more sensors. Operations of the process 1400 includes instantiating a set of interacting software components that represent contents of cells of a discretized representation of an environment (1502). The discretized representation can include a plurality of cells such as in a dynamic occupancy grid. The discretized representation can be substantially similar to those described above with reference to FIG. 14.

Operations of the process 1500 also includes receiving, from one or more sensors of the AV, a vector of sensor observations associated with an interacting software component of the set of interacting software components (1504). The vector of sensor observations can include one or more parameters associated with the interacting software component at a given location. The one or more sensors can include any combinations of the sensors 121 described above. The state of the particle can include for example, one or more velocities (e.g., velocities along different directions) associated with the particle, covariances associated with multiple velocities, and/or a force acting on the at least one particle.

Operations of the process 1400 also includes determining an update to a time-varying particle density function associated with a cell of the cells of the discretized representation corresponding to the given location from the vector of sensor observations (1506). Determining the update to the time-varying particle density function can include determining, using an Eulerian solver or a Lagrangian solver, solutions to one or more differential equations defined on one or more parameters associated with the state of the at least one particle. The Eulerian solver can be substantially similar to the Eulerian solver 1210 described above with reference to FIG. 12. The one or more models can represent a sensor model trained to provide information on probabilities of occupancy of various cells of the discretized representation. The probabilities can be conditioned on corresponding sensor data, as described above, for example with reference to the forward sensor models. In some implementations, determining the update to the particle density function can include determining that the sensor data is missing at least one parameter indicative of the state of the at least one particle, and in response, using a prior value of the at least one parameter in determining the update to the time-varying particle density function. In some cases, this allows for updating particle density functions corresponding to locations that are occluded from the sensors.

Operations of the process 1500 also includes generating a prediction of occupancy of the cell based on the updated particle density function (1508). This can include, for example, determining a probability of occupancy of the at least one cell as a product of (i) a ratio of conditional probabilities generated based on the sensor data and the one or more sensor models, and (ii) an updated time-varying particle density function for the at least one cell. The ratio of conditional probabilities can be a ratio of (i) a first probability of receiving the sensor data conditioned on the at least one cell being occupied and (ii) a second probability of receiving the sensor data conditioned on the at least one cell being unoccupied. The first and second probabilities can be determined using the one or more sensor models. In some implementations, the predictions can be generated, for example, in accordance with equation (5). Operations of the process 1500 also includes augmenting an operation of a vehicle based on the prediction (1510). This can include, for example, steering the vehicle away from cells predicted to be occupied by objects, steering the vehicle into a region predicted to have free-space, or accelerating/braking to avoid a region predicted to be occupied by one or more objects.

In some embodiments, solvers used to solve equations include: finite difference schemes (e.g., upwind difference, Lax-Friedrichs, Lax-Wendroff, Warming-Beam, artificial viscosity methods, etc.) or finite volume schemes (e.g., Godunov method, flux limiting, flux splitting, random choice, etc.) or finite element schemes (e.g., Galerkin, Petrov-Galerkin, discontinuous Galerkin, first-order systems least squares, etc.) or particle-in-cell method or lattice Boltzmann method or boundary element method.

Alternative Embodiments

In an embodiment, at least a portion of the one or more processing devices are disposed in a perception circuit of the vehicle.

In an embodiment, a vehicle includes one or more computer processors and one or more non-transitory storage media storing instructions. The instructions, when executed by the one or more computer processors, cause performance of operations including generating a discretized representation of the environment. The discretized representation includes multiple cells. Each cell is occupied by multiple particles representing at least one of: an object, or a free space in the environment. From one or more sensors of the vehicle, sensor data is received indicative of a state of at least one particle of the multiple particles in the environment. An update to a time-varying particle density function is determined associated with a location of the at least one particle in the dynamic occupancy grid from the sensor data and one or more models associated with the one or more sensors. A prediction of occupancy of at least one cell in the discretized representation is generated based on the updated particle density function. The vehicle is operated based at least in part on the prediction.

In an embodiment, using a processing circuit onboard one or more sensors, a set of interacting software components is instantiated that represent contents of cells of a discretized representation of an environment. From the one or more sensors, a vector of sensor observations is received associated with an interacting software component of the set of interacting software components. The vector of sensor observations includes one or more parameters associated with the interacting software component at a given location. Using the processing circuit, an update to a time-varying particle density function is determined associated with a cell of the cells of the discretized representation corresponding to the given location from the vector of sensor observations. Using the processing circuit, a prediction of occupancy of the cell based on the updated particle density function is determined. Using the processing circuit, an operation of a vehicle based on the prediction is caused.

In an embodiment, the discretized representation includes a grid defined using a structured mesh, a block structured mesh, or an unstructured mesh.

In an embodiment, the grid is defined using a Cartesian or polar coordinate system, or a graphical model.

In an embodiment, for each cell of the plurality of cells, an initial value of occupancy is assigned, which is then updated in accordance with an evolution of the particle density function.

In an embodiment, labels are assigned to the multiple particles, each label indicating whether the corresponding particle represents an object or a free space.

In an embodiment, the labels are updated in accordance with the sensor data.

In an embodiment, continuous weights are assigned to the multiple particles, each weight indicating a contribution of an individual particle to a cumulative density function.

In an embodiment, determining the update to the time-varying particle density function includes computing, using an Eulerian solver or a Lagrangian solver, solutions to one or more differential equations defined on one or more parameters associated with the state of the at least one particle.

In an embodiment, the state of the at least one particle includes at least one velocity associated with the at least one particle.

In an embodiment, the state of the at least one particle includes (i) multiple velocities along corresponding directions, and (ii) covariances associated with the multiple velocities.

In an embodiment, the state of the at least one particle comprises a force acting on the at least one particle.

In an embodiment, each of the one or more models represents a sensor model trained to provide information on probabilities of occupancy of various cells of the discretized representation, the probabilities being conditioned on corresponding sensor data.

In an embodiment, generating the prediction of occupancy of the at least one cell includes determining a probability of occupancy of the at least one cell as a product of (i) a ratio of conditional probabilities generated based on the sensor data and the one or more sensor models, and (ii) an updated time-varying particle density function for the at least one cell.

In an embodiment, the ratio of conditional probabilities is a ratio of (i) a first probability of receiving the sensor data conditioned on the at least one cell being occupied and (ii) a second probability of receiving the sensor data conditioned on the at least one cell being unoccupied, wherein the first and second probabilities are determined using the one or more sensor models.

In an embodiment, determining that the sensor data corresponding to a particular sensor is outside a threshold range of expected values computed using a corresponding model associated with the particular sensor. Responsive to determining that the sensor data corresponding to the particular sensor is outside a threshold range, a fault condition for the particular sensor is identified.

In an embodiment, it is determined that the sensor data is missing at least one parameter indicative of the state of the at least one particle. Responsive to determining that the sensor data is missing the at least one parameter, a prior value of the at least one parameter is used in determining the update to the time-varying particle density function.

In an embodiment, at least a portion of the processing circuit is disposed in a perception circuit of the vehicle.

In an embodiment, a vehicle includes one or more computer processors and one or more non-transitory storage media storing instructions which, when executed by the one or more computer processors, cause performance of operations including instantiating a set of interacting software components that represent contents of cells of a discretized representation of an environment. From the one or more sensors, a vector of sensor observations is received associated with an interacting software component of the set of interacting software components. The vector of sensor observations includes one or more parameters associated with the interacting software component at a given location. An update is determined to a time-varying particle density function associated with a cell of the cells of the discretized representation corresponding to the given location from the vector of sensor observations based on one or more associated with the sensors. A prediction of occupancy of the cell is generated based on the updated particle density function. An operation of the vehicle is augmented based on the prediction.

In an embodiment, one or more processing devices of a vehicle operating in an environment are used to generate a discretized representation of the environment. The discretized representation includes multiple cells. Each cell is occupied by particles representing at least one of: an object, or a free space in the environment. From one or more sensors of the vehicle, sensor data is received indicative of a state of at least one particle of the multiple particles in the environment. Using the one or more processing devices, an update to a time-varying particle density function is determined associated with a location of the at least one particle in the dynamic occupancy grid from the sensor data and one or more models associated with the one or more sensors. Using the one or more processing devices, a prediction of occupancy of at least one cell in the discretized representation is generated based on the updated particle density function. The vehicle is operated using a controller circuit of the vehicle, based at least in part on the prediction.

In an embodiment, the discretized representation includes a grid defined using a Cartesian or polar coordinate system or a graphical model.

In an embodiment, the discretized representation includes a graph where each cell corresponds to a node and two adjacent cells are characterized by an edge on the graph.

In an embodiment, for each cell of the plurality of cells, an initial value of occupancy is assigned, which is then updated in accordance with an evolution of the particle density function.

In an embodiment, labels are assigned to the multiple particles. Each label indicates whether the corresponding particle represents an object or a free space.

In an embodiment, the labels are updated in accordance with the sensor data.

In an embodiment, determining the update to the time-varying particle density function includes determining, using an Eulerian solver, solutions to one or more differential equations or one or more gradient operators defined on one or more parameters associated with the state of the at least one particle.

In an embodiment, the state of the at least one particle includes at least one velocity associated with the at least one particle.

In an embodiment, the state of the at least one particle includes (i) multiple velocities along corresponding directions, and (ii) covariances associated with the multiple velocities.

In an embodiment, the state of the at least one particle includes a force acting on the at least one particle.

In an embodiment, each of the one or more models represents a sensor model trained to provide information on probabilities of occupancy of various cells of the discretized representation, the probabilities being conditioned on corresponding sensor data.

In an embodiment, each of the one or models represents one of: a known probability distribution, a mixture of two or more probability distributions, or an empirical distribution.

In an embodiment, generating the prediction of occupancy of the at least one cell includes determining a probability of occupancy of the at least one cell as a product of (i) a ratio of conditional probabilities generated based on the sensor data and the one or more sensor models, and (ii) an updated time-varying particle density function for the at least one cell.

In an embodiment, the ratio of conditional probabilities is a ratio of (i) a first probability of receiving the sensor data conditioned on the at least one cell being occupied and (ii) a second probability of receiving the sensor data conditioned on the at least one cell being unoccupied, wherein the first and second probabilities are determined using the one or more sensor models.

In an embodiment, it is determined that the sensor data corresponding to a particular sensor is outside a threshold range of expected values determined using a corresponding model associated with the particular sensor. Responsive to determining that the sensor data corresponding to the particular sensor is outside a threshold range, a fault condition is identified for the particular sensor.

In an embodiment, it is determined that the sensor data is missing at least one parameter indicative of the state of the at least one particle. Responsive to determining that the sensor data is missing the at least one parameter, a prior value of the at least one parameter is used in determining the update to the time-varying particle density function.

In an embodiment, at least a portion of the one or more processing devices are disposed in a perception circuit of the vehicle.

In an embodiment, a vehicle includes one or more computer processors and one or more non-transitory storage media storing instructions which, when executed by the one or more computer processors, cause performance of operations including generating a discretized representation of the environment. The discretized representation includes multiple cells. Each cell is occupied by multiple particles representing at least one of: an object, or a free space in the environment. From one or more sensors of the vehicle, sensor data is received indicative of a state of at least one particle of the multiple particles in the environment. An update is determined to a time-varying particle density function associated with a location of the at least one particle in the dynamic occupancy grid from the sensor data and one or more models associated with the one or more sensors. A prediction of occupancy of at least one cell in the discretized representation is generated based on the updated particle density function. The vehicle is operated based at least in part on the prediction.

In an embodiment, using a processing circuit onboard one or more sensors, a set of interacting software components is instantiated that represent contents of cells of a discretized representation of an environment. From the one or more sensors, a vector of sensor observations associated with an interacting software component of the set of interacting software components is received. The vector of sensor observations includes one or more parameters associated with the interacting software component at a given location. Using the processing circuit, an update to a time-varying particle density function associated with a cell of the cells of the discretized representation corresponding to the given location from the vector of sensor observations is determined. Using the processing circuit, a prediction of occupancy of the cell based on the updated particle density function is determined. Using the processing circuit, an operation of a vehicle is performed based on the prediction.

In an embodiment, the discretized representation includes a grid defined using a Cartesian or polar coordinate system.

In an embodiment, for each cell of the plurality of cells, an initial value of occupancy is assigned, which is then updated in accordance with an evolution of the particle density function.

In an embodiment, labels are assigned to the multiple particles. Each label indicates whether the corresponding particle represents an object or a free space.

In an embodiment, the labels are updated in accordance with the sensor data.

In an embodiment, determining the update to the time-varying particle density function includes determining, using an Eulerian solver, solutions to one or more differential equations defined on one or more parameters associated with the state of the at least one particle.

In an embodiment, the state of the at least one particle includes at least one velocity associated with the at least one particle.

In an embodiment, the state of the at least one particle includes (i) multiple velocities along corresponding directions, and (ii) covariances associated with the multiple velocities.

In an embodiment, the state of the at least one particle includes a force acting on the at least one particle.

In an embodiment, each of the one or more models represents a sensor model trained to provide information on probabilities of occupancy of various cells of the discretized representation. The probabilities are conditioned on corresponding sensor data.

In an embodiment, generating the prediction of occupancy of the at least one cell includes determining a probability of occupancy of the at least one cell as a product of (i) a ratio of conditional probabilities generated based on the sensor data and the one or more sensor models, and (ii) an updated time-varying particle density function for the at least one cell.

In an embodiment, the ratio of conditional probabilities is a ratio of (i) a first probability of receiving the sensor data conditioned on the at least one cell being occupied and (ii) a second probability of receiving the sensor data conditioned on the at least one cell being unoccupied. The first and second probabilities are determined using the one or more sensor models.

In an embodiment, it is determined that the sensor data corresponding to a particular sensor is outside a threshold range of expected values determined using a corresponding model associated with the particular sensor. Responsive to determining that the sensor data corresponding to the particular sensor is outside a threshold range, a fault condition is identified for the particular sensor.

In an embodiment, it is determined that the sensor data is missing at least one parameter indicative of the state of the at least one particle. Responsive to determining that the sensor data is missing the at least one parameter, a prior value of the at least one parameter is used in determining the update to the time-varying particle density function.

In an embodiment, at least a portion of the processing circuit is disposed in a perception circuit of the vehicle.

In an embodiment, a vehicle includes one or more computer processors and one or more non-transitory storage media storing instructions which, when executed by the one or more computer processors, cause performance of operations including instantiating a set of interacting software components that represent contents of cells of a discretized representation of an environment. From the one or more sensors, a vector of sensor observations associated with an interacting software component of the set of interacting software components is received. The vector of sensor observations includes one or more parameters associated with the interacting software component at a given location. An update to a time-varying particle density function associated with a cell of the cells of the discretized representation corresponding to the given location from the vector of sensor observations based on one or more associated with the sensors is determined. A prediction of occupancy of the cell based on the updated particle density function is determined. An operation of the vehicle based on the prediction is augmented.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
generating, using one or more processing devices of a vehicle operating in an environment, a discretized representation of the environment, the discretized representation including a plurality of cells, wherein each cell of the plurality of cells is occupied by particles representing at least one of an object or a free space in the environment;
receiving, from one or more sensors of the vehicle, sensor data for at least one particle of the multiple particles in the environment;
determining, from the sensor data, a state of the at least one particle, wherein the state of the at least one particle comprises a force acting on the at least one particle;
assigning continuous weights to the multiple particles, each weight indicating a contribution of an individual particle to a cumulative density function;
determining, using the one or more processing devices, an update to a time-varying particle density function associated with a location of the at least one particle in the dynamic occupancy grid from the sensor data and one or more models associated with the one or more sensors;
generating, using the one or more processing devices, a prediction of occupancy of at least one cell in the discretized representation based on the updated particle density function; and
operating the vehicle, using a controller circuit of the vehicle, based at least in part on the prediction.

2. The method of claim 1, wherein the discretized representation comprises a grid defined using a structured mesh, a block-structured mesh, or an unstructured mesh.

3. The method of claim 2, wherein the grid is defined using a Cartesian or polar coordinate system, or a graphical model.

4. The method of claim 1, wherein the discretized representation comprises a graph where each cell corresponds to a node and two adjacent cells are characterized by an edge on the graph.

5. he method of claim 1, further comprising assigning, for each cell of the plurality of cells, an initial value of occupancy, which is then updated in accordance with an evolution of the particle density function.

6. The method of claim 1, further comprising assigning labels to the multiple particles, each label indicating whether the corresponding particle represents an object or a free space.

7. The method of claim 6, further comprising updating the labels in accordance with the sensor data.

8. The method of claim 1, wherein determining the update to the time-varying particle density function comprises determining, using an Eulerian solver or a Lagrangian solver, solutions to one or more differential equations or one or more gradient operators defined on one or more parameters associated with the state of the at least one particle.

9. The method of claim 8, wherein the state of the at least one particle comprises at least one velocity associated with the at least one particle.

10. The method of claim 9, wherein the state of the at least one particle comprises (i) multiple velocities along corresponding directions, and (ii) covariances associated with the multiple velocities.

11. The method of claim 1, wherein each of the one or more models represents a sensor model trained to provide information on probabilities of occupancy of various cells of the discretized representation, the probabilities being conditioned on corresponding sensor data.

12. The method of claim 1, wherein each of the one or models represents one of: a known probability distribution, a mixture of two or more probability distributions, or an empirical distribution.

13. The method of claim 1, wherein generating the prediction of occupancy of the at least one cell comprises determining a probability of occupancy of the at least one cell as a product of (i) a ratio of conditional probabilities generated based on the sensor data and the one or more sensor models, and (ii) an updated time-varying particle density function for the at least one cell.

14. The method of claim 13, wherein the ratio of conditional probabilities is a ratio of (i) a first probability of receiving the sensor data conditioned on the at least one cell being occupied and (ii) a second probability of receiving the sensor data conditioned on the at least one cell being unoccupied, wherein the first and second probabilities are determined using the one or more sensor models.

15. The method of claim 1, further comprising:
determining that the sensor data corresponding to a particular sensor is outside a threshold range of expected values determined using a corresponding model associated with the particular sensor; and
responsive to determining that the sensor data corresponding to the particular sensor is outside a threshold range, identifying a fault condition for the particular sensor.

16. The method claim 1, further comprising:
determining that the sensor data is missing at least one parameter indicative of the state of the at least one particle; and
responsive to determining that the sensor data is missing the at least one parameter, using a prior value of the at least one parameter in determining the update to the time-varying particle density function.

17. A vehicle comprising:
one or more computer processors; and
one or more non-transitory storage media storing instructions which, when executed by the one or more computer processors, cause performance of operations comprising:
generating a discretized representation of an environment, the discretized representation including a plurality of cells, wherein each cell of the plurality of cells is occupied by particles representing at least one of: an object, or a free space in the environment;
receiving, from one or more sensors of the vehicle, sensor data for at least one particle of the multiple particles in the environment;
determining, from the sensor data, a state of the at least one particle, wherein the state of the at least one particle comprises a force acting on the at least one particle;
assigning continuous weights to the multiple particles, each weight indicating a contribution of an individual particle to a cumulative density function;
determining an update to a time-varying particle density function associated with a location of the at least one particle in the dynamic occupancy grid from the sensor data and one or more models associated with the one or more sensors;
generating a prediction of occupancy of at least one cell in the discretized representation based on the updated particle density function; and
operating the vehicle, using a controller circuit of the vehicle, based at least in part on the prediction.

18. One or more non-transitory storage media storing instructions which, when executed by one or more computing devices, cause performance of operations comprising:
generating a discretized representation of an environment, the discretized representation including a plurality of cells, wherein each cell of the plurality of cells is occupied by particles representing at least one of: an object, or a free space in the environment;
receiving, from one or more sensors of a vehicle, sensor data for at least one particle of the multiple particles in the environment;
determining a state of the at least one particle, wherein the state of the at least one particle comprises a force acting on the at least one particle;
assigning continuous weights to the multiple particles, each weight indicating a contribution of an individual particle to a cumulative density function;
determining an update to a time-varying particle density function associated with a location of the at least one particle in the dynamic occupancy grid from the sensor data and one or more models associated with the one or more sensors;
generating a prediction of occupancy of at least one cell in the discretized representation based on the updated particle density function; and
operating the vehicle, using a controller circuit of the vehicle, based at least in part on the prediction.

19. A method comprising:
instantiating, using a processing circuit onboard one or more sensors, a set of interacting software components of the discretized representation that represent contents of cells of a discretized representation of an environment;
receiving, from the one or more sensors, a vector of sensor observations associated with an interacting software component of the set of interacting software components, the vector of sensor observations including one or more parameters associated with the interacting software component at a given location;

assigning continuous weights to multiple particles, each weight indicating a contribution of an individual particle to a cumulative density function;

determining, using the processing circuit, an update to a time-varying particle density function associated with at least one cell of the cells of the discretized representation corresponding to the given location from the vector of sensor observations;

generating, using the processing circuit, a prediction of occupancy of the at least one cell based on the updated particle density function; and augmenting, using the processing circuit, an operation of a vehicle based on the prediction.

20. The method of claim 19, wherein the discretized representation comprises a grid defined using a structured mesh, a block structured mesh, or an unstructured mesh.

21. The method of claim 20, wherein the grid is defined using a Cartesian or polar coordinate system, or a graphical model.

22. The method of claim 19, further comprising assigning, for each cell of the cells of the discretized representation, initial value of occupancy, which is then updated in accordance with an evolution of the particle density function.

23. The method of claim 19, further comprising assigning labels to multiple particles of the cells of the discretized representation, each label indicating whether a corresponding particle represents an object or a free space.

24. The method of claim 23, further comprising updating the labels in accordance with the sensor observations.

25. The method of claim 19, wherein determining the update to the time-varying particle density function comprises determining, using an Eulerian solver or a Lagrangian solver, solutions to one or more differential equations defined on one or more parameters associated with the state of at least one particle.

26. The method of claim 25, wherein the state of the at least one particle comprises at least one velocity associated with at least one particle.

27. The method of claim 26, wherein the state of at least one particle comprises (i) multiple velocities along corresponding directions, and (ii) covariances associated with the multiple velocities.

28. The method of claim 19, wherein the state of at least one particle comprises a force acting on the at least one particle.

29. The method of claim 19, wherein each of one or more models represents a sensor model trained to provide information on probabilities of occupancy of various cells of the discretized representation, the probabilities being conditioned on corresponding sensor observations.

30. The method of claim 19, wherein generating the prediction of occupancy of the at least one cell comprises determining a probability of occupancy of the at least one cell as a product of (i) a ratio of conditional probabilities generated based on sensor observations and one or more sensor models, and (ii) an updated time-varying particle density function for the at least one cell.

31. The method of claim 30, wherein the ratio of conditional probabilities is a ratio of (i) a first probability of receiving sensor observations conditioned on the at least one cell being occupied and (ii) a second probability of receiving the sensor observations conditioned on the at least one cell being unoccupied, wherein the first and second probabilities are determined using the one or more sensor models.

32. The method of claim 19, further comprising:
determining that sensor observations corresponding to a particular sensor is outside a threshold range of expected values determined using a corresponding model associated with the particular sensor; and
responsive to determining that the sensor observations corresponding to the particular sensor is outside a threshold range, identifying a fault condition for the particular sensor.

33. The method of claim 19, further comprising:
determining that the sensor observations are missing at least one parameter indicative of the state of at least one particle; and
responsive to determining that the sensor observations are missing the at least one parameter, using a prior value of the at least one parameter in determining the update to the time-varying particle density function.

34. The method of claim 19, wherein at least a portion of the processing circuit is disposed in a perception circuit of the vehicle.

35. A vehicle comprising:
one or more computer processors; and
one or more non-transitory storage media storing instructions which, when executed by the one or more computer processors, cause performance of operations comprising:
instantiate a set of interacting software components that represent contents of cells of a discretized representation of an environment;
receive, from one or more sensors, a vector of sensor observations associated with an interacting software component of the set of interacting software components, the vector of sensor observations including one or more parameters associated with the interacting software component at a given location;
assigning continuous weights to multiple particles, each weight indicating a contribution of an individual particle to a cumulative density function;
determine an update to a time-varying particle density function associated with a cell of the cells of the discretized representation corresponding to the given location from the vector of sensor observations based on one or more associated with the sensors;
generate a prediction of occupancy of the cell based on the updated particle density function; and
augment an operation of the vehicle based on the prediction.

36. One or more non-transitory storage media storing instructions which, when executed by one or more computing devices, cause performance of operations comprising:
receiving, from one or more sensors, a vector of sensor observations associated with an interacting software component of a set of interacting software components, the vector of sensor observations including one or more parameters associated with the interacting software component at a given location;
assigning continuous weights to multiple particles, each weight indicating a contribution of an individual particle to a cumulative density function;
determining, using a processing circuit, an update to a time-varying particle density function associated with a cell of cells of a discretized representation corresponding to the given location from the vector of sensor observations;
generating, using the processing circuit, a prediction of occupancy of the cell based on the updated particle density function; and augmenting, using the processing circuit, an operation of a vehicle based on the prediction.

\* \* \* \* \*